United States Patent
Tominaga et al.

(10) Patent No.: US 11,142,618 B2
(45) Date of Patent: Oct. 12, 2021

(54) BIAXIALLY STRETCHED POLYPROPYLENE FILM, METALLIZED FILM FOR CAPACITORS, AND CAPACITOR

(71) Applicant: Oji Holdings Corporation, Tokyo (JP)

(72) Inventors: Takeshi Tominaga, Tokyo (JP); Michiko Sueyoshi, Tokyo (JP); Yoshimune Okuyama, Tokyo (JP); Masahiro Nakata, Tokyo (JP); Tadakazu Ishiwata, Tokyo (JP)

(73) Assignee: Oji Holdings Corporation, Tokyo (JP)

(*) Notice: Subject to any disclaimer, the term of this patent is extended or adjusted under 35 U.S.C. 154(b) by 303 days.

(21) Appl. No.: 16/335,376

(22) PCT Filed: Sep. 22, 2017

(86) PCT No.: PCT/JP2017/034339
§ 371 (c)(1),
(2) Date: Mar. 21, 2019

(87) PCT Pub. No.: WO2018/056404
PCT Pub. Date: Mar. 29, 2018

(65) Prior Publication Data
US 2019/0284354 A1    Sep. 19, 2019

(30) Foreign Application Priority Data
Sep. 23, 2016 (JP) .............................. JP2016-185779

(51) Int. Cl.
*C08J 5/18* (2006.01)
*C08L 23/12* (2006.01)
*H01G 4/18* (2006.01)

(52) U.S. Cl.
CPC .............. *C08J 5/18* (2013.01); *C08L 23/12* (2013.01); *H01G 4/18* (2013.01); *C08J 2323/12* (2013.01); *C08J 2423/12* (2013.01); *C08L 2203/16* (2013.01); *C08L 2205/025* (2013.01)

(58) Field of Classification Search
CPC .............. C08J 5/18; C08L 23/12; H01G 4/18
See application file for complete search history.

(56) References Cited

U.S. PATENT DOCUMENTS

| 5,724,222 A | 3/1998 | Hirano et al. |
| 2017/0229243 A1* | 8/2017 | Nakata ..................... H01G 4/18 |
| 2019/0315047 A1* | 10/2019 | Tominaga ............. B32B 15/085 |

FOREIGN PATENT DOCUMENTS

| JP | 03-120028 A | 5/1991 | |
| JP | 3752747 B | 3/2006 | |
| JP | 3791038 B | 4/2006 | |
| JP | 2014-055276 A | 3/2014 | |
| JP | 2014-055283 | 3/2014 | |
| JP | 2014-231584 A | 12/2014 | |
| JP | 2015-201610 A | 11/2015 | |
| WO | WO-2016051496 A1 * | 4/2016 | ............. B32B 27/32 |

OTHER PUBLICATIONS

International Preliminary Report on Patentability issued in International Patent Application No. PCT/JP2017/034339, dated Mar. 26, 2019.
International Search Report issued in International Application No. PCT/JP2017/034339, dated Dec. 19, 2017.
Office Action from Korean Patent Application No. 10-2019-7010710 dated Jun. 9, 2020.

* cited by examiner

*Primary Examiner* — Tahseen Khan
(74) *Attorney, Agent, or Firm* — Knobbe Martens Olson & Bear LLP

(57) ABSTRACT

A biaxially stretched polypropylene film including a polypropylene resin and satisfying the following: (a) the crystallite size $S_a$, which is determined using the Scherrer equation from the full width at half maximum of the α-crystal (040) plane reflection peak as measured by wide-angle x-ray diffraction after treatment for 200 hours at 105° C., is not more than 12.9 nm; and (b) the planar orientation coefficient $\Delta P_a$, which is calculated from the birefringence values $\Delta Nyz$ and $\Delta Nxz$ with respect to the thickness direction as determined by optical birefringence measurement after treatment for 200 hours at 105° C., is at least 0.013 ($\Delta P_a = (\Delta Nyz + \Delta Nxz)/2$).

11 Claims, No Drawings

BIAXIALLY STRETCHED POLYPROPYLENE FILM, METALLIZED FILM FOR CAPACITORS, AND CAPACITOR

TECHNICAL FIELD

The present invention relates to a biaxially stretched polypropylene film, a metallized film for capacitors, and a capacitor.

BACKGROUND ART

A biaxially stretched polypropylene film has excellent electrical properties such as voltage resistance and low dielectric loss as well as high moisture resistance. By making use of these properties, a biaxially stretched polypropylene film is used for electronic and electrical devices as a dielectric film for capacitors, such as high-voltage capacitors, filter capacitors including various switching power supplies, converters, and inverters, and smoothing capacitors. Further, a polypropylene film is beginning to be used also as capacitors for inverter power supplies that control drive motors of electric cars, hybrid cars, and the like that are highly demanded in recent years.

For that purpose of use, a capacitor used for automobiles are always exposed to a high temperature, so that it is demanded that dielectric breakdown is further reduced even in a high-temperature environment, and the capacitor exhibits a stable function.

Even in a biaxially stretched polypropylene film used for obtaining such a capacitor, voltage resistance properties in a high temperature region must be ensured. For example, Patent Document 1 discloses that a long-term voltage resistance is improved by controlling the crystallite size and the birefringence value ΔNyz to be within specific ranges. Patent Documents 2 to 3 disclose that a long-term voltage resistance in a high temperature environment is improved by normalizing the crystallization degree and heat shrinkage. Patent Document 4 discloses that a high temperature rigidity and heat resistance are improved by setting the molecular weight distribution and stereoregularity of polypropylene to be within specific ranges and controlling the planar orientation to have a specific value or more by biaxial stretching.

PRIOR ART DOCUMENTS

Patent Documents

Patent Document 1: JP-A-2014-231584
Patent Document 2: JP-3791038
Patent Document 3: JP-3752747
Patent Document 4: JP-A-2014-55276

SUMMARY OF THE INVENTION

Problems to be Solved by the Invention

However, even with any of the polypropylene resins, the problem of dielectric breakdown in the case in which a high voltage is applied for a long period of time in a high temperature environment has not yet been sufficiently solved.

An object of the present invention is to provide a biaxially stretched polypropylene film in which dielectric breakdown is further reduced (for example, decrease in capacitance is further reduced even at a high temperature (for example, 100 to 110° C.) and at a high voltage, particularly when the capacitor is used for a long period of time at a high temperature and at a high voltage.

Means for Solving the Problems

As a result of repeated extensive researches in order to solve the aforementioned problems, the present inventors have come to pay attention to the crystallite size $S_a$ of a biaxially stretched polypropylene film after heat treatment of the film at a high temperature and the planar orientation coefficient $\Delta P_a$ calculated from the birefringence values (ΔNyz and ΔNxz). Further, the present inventors have found out that these two parameters combined together affect the degree of dielectric breakdown at a high temperature and at a high voltage. As a result of forwarding the researches based on these findings, the present inventors have found out that the degree of dielectric breakdown at a high temperature and at a high voltage can be further reduced by setting these two parameters to be within prescribed ranges. The present invention has been completed based on such findings.

In other words, the present invention encompasses the following modes.

Item 1. A biaxially stretched polypropylene film comprising a polypropylene resin and satisfying following (a) and (b):

(a) a crystallite size $S_a$, which is determined using a Scherrer's equation from a half width of an α-crystal (040) plane reflection peak as measured by wide-angle X-ray diffraction after treatment for 200 hours at 105° C., is 12.9 nm or less, and (b) a planar orientation coefficient $\Delta P_a$, which is calculated from birefringence values ΔNyz and ΔNxz with respect to a thickness direction as determined by optical birefringence measurement after treatment for 200 hours at 105° C., is 0.013 or more (where $\Delta P_a=(\Delta Nyz+\Delta Nxz)/2$).

Item 2. The biaxially stretched polypropylene film according to item 1, which is for capacitors.

Item 3. The biaxially stretched polypropylene film according to item 1 or 2, further satisfying following (c):

(c) a ratio of the crystallite size $S_a$ of the (a) with respect to a crystallite size $S_b$ that is determined using a Scherrer's equation from a half width of an α-crystal (040) plane reflection peak as measured by wide-angle X-ray diffraction before treatment for 200 hours at 105° C. (the ratio being $S_a/S_b$), is 1 or more and 1.125 or less.

Item 4. The biaxially stretched polypropylene film according to any one of items 1 to 3, further satisfying following (d):

(d) a ratio of the planar orientation coefficient $\Delta P_a$ of the (b) with respect to a planar orientation coefficient $\Delta P_b$ that is calculated from birefringence values ΔNyz and ΔNxz with respect to a thickness direction as determined by optical birefringence measurement before treatment for 200 hours at 105° C. (the ratio being $\Delta P_a/\Delta P_b$), is 1.085 or more (where $\Delta P_b=(\Delta Nyz+\Delta Nxz)/2$).

Item 5. The biaxially stretched polypropylene film according to any one of items 1 to 4, wherein the crystallite size $S_a$ of the (a) is 11.5 nm or more.

Item 6. The biaxially stretched polypropylene film according to any one of items 1 to 5, wherein the polypropylene resin comprises at least two or more kinds of a polypropylene resin A and a polypropylene resin B;

a molecular weight distribution (Mw/Mn) of the polypropylene resin A is within a range of 8.8 or more to 12 or less; and a molecular weight distribution (Mw/Mn) of the polypropylene resin B is within a range of less than 8.8.

Item 7. The biaxially stretched polypropylene film according to any one of items 1 to 6, wherein the polypropylene resin comprises at least two or more kinds of a polypropylene resin A and a polypropylene resin B;

the polypropylene resin A has a difference ($D_M$), as obtained by subtracting a differential distribution value when a logarithmic molecular weight Log(M)=6.0 from a differential distribution value when Log(M)=4.5 on a molecular weight differential distribution curve, of 8% or more and 18% or less based on 100% (standard) of the differential distribution value when Log(M)=6.0; and the polypropylene resin B has a difference ($D_M$), as obtained by subtracting a differential distribution value when a logarithmic molecular weight Log(M)=6.0 from a differential distribution value when Log(M)=4.5 on a molecular weight differential distribution curve, of −1% or more and less than 8% based on 100% (standard) of the differential distribution value when Log(M)=6.0.

Item 8. The biaxially stretched polypropylene film according to any one of items 1 to 7, having a thickness of 1 to 6 μm.

Item 9. A metallized film for capacitors, having a metal film on one surface or on both surfaces of a biaxially stretched polypropylene film according to any one of items 1 to 8.

Item 10. A capacitor comprising a metallized film for capacitors according to item 9.

Effect of the Invention

With the polypropylene film of the present invention, dielectric breakdown is further reduced even at a high temperature (for example, 100 to 110° C.) and at a high voltage, particularly when the capacitor is used for a long period of time at a high temperature and at a high voltage.

Also, the polypropylene film of the present invention can be reduced in thickness, so that scale reduction and weight reduction of the obtained capacitor can be expected.

For this reason, it can be expected that a capacitor obtained by using the polypropylene film of the present invention is suitably used as a high-capacitance capacitor to which a high voltage is applied at a high temperature.

MODE FOR CARRYING OUT THE INVENTION

In the present specification, the expressions of "contain" and "comprise" encompass the concepts of "contain", "comprise", "be substantially made of", and "consist only of".

In the present specification, the expression of "capacitor" encompasses the concepts of "capacitor", "capacitor element", and "film capacitor".

<1. Biaxially Stretched Polypropylene Film for Capacitors>

Hereafter, a biaxially stretched polypropylene film for capacitors according to one embodiment of the present invention will be described. Here, in the following, a biaxially stretched polypropylene film for capacitors will be described; however, the biaxially stretched polypropylene film according to the present invention is not limited to those for capacitors.

The biaxially stretched polypropylene film for capacitors according to the present embodiment is a biaxially stretched polypropylene film for capacitors that contains a polypropylene resin and satisfies the following (a) and (b):

(a) a crystallite size $S_a$, which is determined using a Scherrer's equation from a half width of an α-crystal (040) plane reflection peak as measured by wide-angle X-ray diffraction after treatment for 200 hours at 105° C., is 12.9 nm or less, and (b) a planar orientation coefficient $\Delta P_a$, which is calculated from birefringence values ΔNyz and ΔNxz with respect to a thickness direction as determined by optical birefringence measurement after treatment for 200 hours at 105° C., is 0.013 or more (where $\Delta P_a$=(ΔNyz+ΔNxz)/2). Hereinafter, this will be explained in detail.

Here, the biaxially stretched polypropylene film for capacitors according to the present embodiment is not a microporous film and hence does not have numerous pores.

<1-1. Crystallite Size>

In the present specification, the "crystallite size" of the polypropylene film refers to a crystallite size determined by the Scherrer's equation, described later, using the diffraction reflection peak of the α-crystal (040) plane of the polypropylene film measured by a wide angle X-ray diffraction method (XRD method). As the crystallite size is smaller, the leakage current is smaller, and structural damage by Joule heating is less likely to occur. Consequently, the heat resistance, voltage resistance, long-term heat resistance, and long-term voltage resistance can be preferably improved. However, in view of mechanical strength etc., and in consideration of the lamellar (folded crystal) thickness of the high-molecular-weight chain, the lower limit of the crystallite size is generally considered to be around 10 nm, preferably 11 nm.

The "crystallite size" of the polypropylene film according to the present embodiment is specifically determined in the following manner. First, the biaxially stretched polypropylene film and its metallized film are subjected to wide angle X-ray diffraction measurement, and the half width of the diffraction reflection peak of the obtained α-crystal (040) plane is determined. Next, the crystallite size is calculated using the Scherrer's equation shown in the following numerical formula (1).

$$D=K\times\lambda/(\beta\times\cos\theta) \qquad \text{Equation (1):}$$

[wherein D is the crystallite size (nm), K is the constant (shape factor), λ is the wavelength (nm) of the X rays used, β is the half width of the diffraction reflection peak of the α-crystal (040) plane, and θ is the diffraction Bragg angle of the α-crystal (040) plane.]

In the present embodiment, a desktop X-ray diffractometer MiniFlex300 (trade name) produced by Rigaku Corporation is specifically used to measure the diffraction reflection peak of the α-crystal (040) plane. The X-rays used are generated at an output of 30 kV and 10 mA. CuKα rays (wavelength: 0.15418 nm) monochromatized by graphite monochromator are collimated by a slit, and applied to the measurement film. The diffraction intensity is measured using a scintillation counter by 2θ/θ continuous scanning using a goniometer. The half width of the diffraction reflection peak of the α-crystal (040) plane is determined from the obtained data using an integrated X-ray powder diffraction software PDXL originally bundled with the apparatus.

As a result of the above measurement, the crystallite size can be determined by the Scherrer's equation (1) using the θ and half width of the obtained diffraction reflection peak. In the present embodiment, the shape factor constant K is 0.94, and λ is 0.15418 nm.

In general, the crystallite size can be controlled by the cooling conditions, stretching conditions, etc., during formation of a cast stock. The crystallite size tends to be smaller at a lower cast temperature, and the crystallite size is smaller at a higher stretch ratio.

The polypropylene film of the present embodiment satisfies that the crystallite size after treatment for 200 hours at 105° C. (more specifically, after being left to stand quietly for 200 hours at 105° C. and then being left to stand quietly for one hour at room temperature (0 to 30° C.) (this crystallite size after the treatment may be referred to as "crystallite size $S_a$" or "$S_a$" in the present specification) is 12.9 nm or less. By satisfying both of these conditions and the planar orientation coefficient $\Delta P_a$ described later, dielectric breakdown can be further reduced even at a high temperature and at a high voltage, particularly when the capacitor is used for a long period of time at a high temperature and at a high voltage. When a biaxially stretched polypropylene film in which the crystallite size $S_a$ after treatment for 200 hours at 105° C. is within the aforementioned range is used, electric current does not pass through the inside of the crystal even at a high temperature, so that the leakage current decreases due to its morphological effect. This, combined with the later-mentioned effect brought about by the planar orientation coefficient $\Delta P_a$, results in suppression of the structural damage generation by Joule heating, so that the dielectric breakdown can be further reduced even at a high temperature and at a high voltage, particularly when the capacitor is used for a long period of time at a high temperature and at a high voltage.

The crystallite size of the polypropylene film of the present embodiment, which is measured before the heat treatment (treatment for 200 hours at 105° C.) for determining the aforementioned crystallite size $S_a$ (this crystallite size before the heat treatment may be referred to as "crystallite size $S_b$" or "$S_b$" in the present specification), although not limitative, is preferably 11 nm or more and 12.5 nm or less, more preferably 11.3 nm or more and 12 nm or less, in view of further reducing the dielectric breakdown at a high temperature and at a high voltage. Here, in the present specification, the crystallite sizes $S_a$ and $S_b$ are values measured at room temperature (0 to 30° C.)

The aforementioned crystallite size $S_a$ of the polypropylene film of the present embodiment is preferably 11.5 nm or more, more preferably 12 nm or more, and still more preferably 12.4 nm or more, in view of further reducing the dielectric breakdown at a high temperature and at a high voltage.

The polypropylene film of the present embodiment preferably satisfies that the ratio of the crystallite size $S_a$ with respect to the crystallite size $S_b$ that is determined before treatment for 200 hours at 105° C. (the ratio being $S_a/S_b$), is 1 or more and 1.125 or less in view of further reducing the dielectric breakdown at a high temperature and at a high voltage. More specifically, this ratio of the crystallite size $S_a$ with respect to the crystallite size $S_b$ is a value obtained by dividing the crystallite size $S_a$ by the crystallite size $S_b$ that is measured before the heat treatment (treatment for 200 hours at 105° C.) for determining the crystallite size $S_a$ (more specifically, measured at room temperature (0 to 30° C.)). The ratio of the crystallite size $S_a$ with respect to the crystallite size $S_b$ (that is, $S_a/S_b$) is more preferably, for example, 1.05 or more and 1.12 or less, still more preferably 1.07 or more and 1.115 or less, in view of further reducing the dielectric breakdown at a high temperature and at a high voltage. The ratio $S_a/S_b$ represents the temperature dependency of the crystallite size, and the aforementioned preferable ranges (for example, 1 or more and 1.125 or less) each mean that the temperature dependency is low. In other words, when the temperature dependency is low, increase of the crystallite size caused by thermal factors when the capacitor is used for a long period of time in an environment of high temperature and high voltage is suppressed, so that the leakage current is small, and structural damage by Joule heating is further suppressed.

<1-2. Planar Orientation Coefficient $\Delta P$>

In the present specification, the "planar orientation coefficient $\Delta P$" refers to a planar orientation coefficient $\Delta P$ calculated from birefringence values $\Delta Nyz$ and $\Delta Nxz$ with respect to the thickness direction of the polypropylene film as determined by optical birefringence measurement (where $\Delta P=(\Delta Nyz+\Delta Nxz)/2$).

n the present invention, the "value of birefringence $\Delta Nyz$" with respect to the thickness direction of the polypropylene film refers to a value of birefringence $\Delta Nyz$ with respect to the thickness direction measured by an optical birefringence measurement. More specifically, the value of birefringence $\Delta Nyz$ is obtained in the following manner. The main axes in the in-plane direction of the film are regarded as the x-axis and the y-axis, and the thickness direction (normal direction relative to the in-plane direction) of the film is regarded as the z-axis. Of the in-plane direction axes, the slow axis having a higher refractive index is regarded as the x-axis. A value obtained by subtracting a three-dimensional refractive index in the z-axial direction from a three-dimensional refractive index in the y-axial direction is the value of birefringence $\Delta Nyz$.

In the present specification, the "value of birefringence $\Delta Nxz$" with respect to the thickness direction of the polypropylene film refers to a value of birefringence $\Delta Nxz$ with respect to the thickness direction measured by an optical birefringence measurement. More specifically, a value obtained by subtracting a three-dimensional refractive index in the z-axial direction from a three-dimensional refractive index in the x-axial direction (slow axis direction) is the value of birefringence $\Delta Nxz$.

The value of birefringence $\Delta Nyz$ and/or $\Delta Nxz$ can be used as the index of film orientation intensity. When the film orientation intensity is high, the three-dimensional refractive index in the y-axial direction and/or the three-dimensional refractive index in the x-axial direction, which are in-plane refractive indices, are higher, and the three-dimensional refractive index in the z-axial direction, which is the refractive index in the thickness direction, is lower. Thus, the value of birefringence $\Delta Nyz$ and/or $\Delta Nxz$ becomes large.

In the present embodiment, a RE-100 retardation measuring device (produced by Otsuka Electronics Co., Ltd.) is specifically used to measure the "value of birefringence $\Delta Nyz$" with respect to the thickness direction of the polypropylene film. Retardation (phase difference) is measured by a gradient method. More specifically, the main axes in the in-plane direction of the film are regarded as the x-axis and the y-axis, and the thickness direction (normal direction relative to the in-plane direction) of the film is regarded as the z-axis. Of the in-plane direction axes, the slow axis having a higher refractive index is regarded as the x-axis. Each of the retardation values when the x-axis, which serves as an inclined axis, is inclined 10° by 10° within the range of 0° to 50° relative to the z-axis is determined. Birefringence $\Delta Nyz$ in the y-axial direction with respect to the thickness direction (z-axial direction) is calculated from the obtained retardation values using the method described in the non-patent document "Hiroshi AWAYA, Guide for polarization microscope of high-molecular-weight material, pp. 105-120, 2001." First, with respect to each inclination angle $\phi$, the value of R/d obtained by dividing the measured retardation value R by the thickness d subjected to inclination correction is determined. A difference between R/d when $\phi=0°$ and each of R/d when $\phi=10°, 20°, 30°, 40°, 50°$ is determined, and the difference is further divided by sin 2r (r: refraction angle) to obtain the birefringence $\Delta Nzy$ for each $\phi$, followed by reversing the positive and negative signs to obtain the value of birefringence ΔNyz. The value of birefringence ΔNyz is calculated as an average of ΔNyz when ϕ=20°, 30°, 40°, 50°. Here, for example, in a sequential stretching method, when the stretch ratio in the TD direction (transverse direction) is higher than the stretch ratio in the MD direction (machine direction), the TD direction serves as the slow axis (x-axis), and the MD direction serves as the y-axis. Further, for the values of refraction angle r at respective inclination angles with respect to polypropylene, those described on page 109 of the aforementioned Document are used.

Also, in the present embodiment, regarding the "value of birefringence ΔNxz" with respect to the thickness direction of the polypropylene film, the value obtained by dividing the retardation value R measured at an inclination angle of ϕ=0° by the thickness d is divided by ΔNzy determined in the above to calculate the value of birefringence ΔNxz.

When the polypropylene film is oriented in the plane direction (x-axial direction and/or y-axial direction), the refractive index Nz in the thickness direction changes to increase the birefringence ΔNyz and/or ΔNxz, and the voltage resistance is improved (dielectric breakdown voltage is increased). The reason for this is considered to be as follows. When the molecular chains of polypropylene are oriented in the plane direction, the refractive index Nz in the thickness direction becomes low. The electrical conductivity in the film-thickness direction is a transfer between the molecular chains, and is therefore low. Accordingly, when the molecular chains of polypropylene are oriented in the plane direction (when the value of birefringence ΔNyz and/or ΔNxz is large), the electrical conductivity in the film-thickness direction can be a transfer between the molecular chains; thus, it is considered that the voltage resistance is improved as compared with a case in which the polypropylene molecule chains are not oriented in the plane direction (the value of birefringence ΔNyz and/or ΔNxz is small).

In general, the "value of birefringence ΔNyz" and/or the "value of birefringence ΔNxz" can be controlled by changing the film-forming conditions (e.g., adjustment of the stretch ratio) to thereby change the orientation of the polypropylene molecule chains. Moreover, the "value of birefringence ΔNyz" and/or the "value of birefringence ΔNxz" can also be controlled by changing the properties (e.g., molecular weight, polymerization degree, and molecular weight distribution) of the polypropylene resin.

The "planar orientation coefficient ΔP" is determined by substituting the values of birefringence ΔNyz and ΔNxz into the equation: ΔP=(ΔNyz+ΔNxz)/2. In the present invention, one characteristic feature lies in paying attention to the "planar orientation coefficient ΔP" that is calculated by taking not only the orientation intensity in the y-axial direction represented by the value of birefringence ΔNyz but also the orientation intensity in the x-axial direction represented by the value of birefringence ΔNxz into consideration. The planar orientation coefficient ΔP becomes a comparatively small value when the value of birefringence ΔNxz is extremely small even if the value of birefringence ΔNyz is very large. Assuming a case in which the difference in length between the longer axis and the shorter axis of the cross-section at the site where the polypropylene molecule chains exist is large, the longer axis direction can approach (or can be coincident with) the film thickness direction when one of the birefringence values is extremely small and, in this case, it is considered that the electrical conductivity in the film thickness direction is enhanced, and the voltage resistance decreases. Accordingly, it is considered that the voltage resistance is enhanced when both of the value of birefringence ΔNyz and the value of birefringence ΔNxz are not extremely low, and the planar orientation coefficient ΔP is thereby a certain value or more.

The polypropylene film of the present embodiment satisfies that the planar orientation coefficient after treatment for 200 hours at 105° C. (more specifically, after being left to stand quietly for 200 hours at 105° C. and then being left to stand quietly for one hour at room temperature (0 to 30° C.)) (this planar orientation coefficient after the treatment may be referred to as "planar orientation coefficient $\Delta P_a$" or "$\Delta P_a$" in the present specification) is 0.013 or more. By satisfying both of these conditions and the crystallite size $S_a$ described before, dielectric breakdown can be further reduced even at a high temperature and at a high voltage, particularly when the capacitor is used for a long period of time at a high temperature and at a high voltage. When a biaxially stretched polypropylene film in which the planar orientation coefficient $\Delta P_a$ after treatment for 200 hours at 105° C. is within the aforementioned range is used, the electric current, even at a high temperature, flows mainly along the resin molecule chains that are oriented in the in-plane direction and is less likely to flow in the film thickness direction (normal direction relative to the in-plane direction), resulting in a smaller leakage current. This, combined with the aforementioned effect brought about by the crystallite size $S_a$, results in suppression of the structural damage generation by Joule heating, so that the dielectric breakdown can be further reduced even at a high temperature and at a high voltage, particularly when the capacitor is used for a long period of time at a high temperature and at a high voltage.

The planar orientation coefficient of the polypropylene film of the present embodiment, which is measured before the heat treatment (treatment for 200 hours at 105° C.) for determining the aforementioned planar orientation coefficient $\Delta P_a$ (this planar orientation coefficient before the heat treatment may be referred to as "planar orientation coefficient $\Delta P_b$" or "$\Delta P_b$" in the present specification), although not limitative, is preferably 0.011 or more and 0.014 or less, more preferably 0.0113 or more and 0.0138 or less, and still more preferably 0.0115 or more and 0.013 or less, in view of further reducing the dielectric breakdown at a high temperature and at a high voltage. Here, in the present specification, the planar orientation coefficients $\Delta P_a$ and $\Delta P_b$ are values measured at room temperature (0 to 30° C.)

The value of birefringence ΔNyz of the polypropylene film of the present embodiment, which is measured before the heat treatment (treatment for 200 hours at 105° C.) for determining the aforementioned planar orientation coefficient $\Delta P_a$, although not limitative, is preferably 0.0025 to 0.011 or less in view of further reducing the dielectric breakdown at a high temperature and at a high voltage. Here, in the present specification, the value of birefringence ΔNyz is a value measured at room temperature (0 to 30° C.).

The value of birefringence ΔNxz of the polypropylene film of the present embodiment, which is measured before the heat treatment (treatment for 200 hours at 105° C.) for determining the aforementioned planar orientation coefficient $\Delta P_a$, although not limitative, is preferably 0.0135 to 0.022 or less in view of further reducing the dielectric breakdown at a high temperature and at a high voltage. Here, in the present specification, the value of birefringence ΔNxz is a value measured at room temperature (0 to 30° C.)

The aforementioned planar orientation coefficient $\Delta P_a$ of the polypropylene film of the present embodiment is preferably 0.013 or more and 0.016 or less, more preferably 0.013 or more and 0.0155 or less, still more preferably 0.0131 or more and 0.015 or less, further more preferably 0.0132 or more and 0.0145 or less, and particularly preferably 0.0133 or more and 0.014 or less, in view of further reducing the dielectric breakdown at a high temperature and at a high voltage.

The value of birefringence ΔNyz of the polypropylene film of the present embodiment after treatment for 200 hours at 105° C. (more specifically, after being left to stand quietly for 200 hours at 105° C. and then being left to stand quietly for one hour at room temperature (0 to 30° C.)), although not limitative, is preferably 0.0046 to 0.015 in view of further reducing the dielectric breakdown at a high temperature and at a high voltage.

The value of birefringence ΔNxz of the polypropylene film of the present embodiment after treatment for 200 hours at 105° C. (more specifically, after being left to stand quietly for 200 hours at 105° C. and then being left to stand quietly for one hour at room temperature (0 to 30° C.)), although not limitative, is preferably 0.0156 to 0.033 in view of further reducing the dielectric breakdown at a high temperature and at a high voltage.

The polypropylene film of the present embodiment preferably satisfies that the ratio of the planar orientation coefficient $\Delta P_a$ with respect to the planar orientation coefficient $\Delta P_b$ that is determined before treatment for 200 hours at 105° C. (the ratio being $\Delta P_a/\Delta P_b$) is 1.085 or more in view of further reducing the dielectric breakdown at a high temperature and at a high voltage. More specifically, this ratio of the planar orientation coefficient $\Delta P_a$ with respect to the planar orientation coefficient $\Delta P_b$ is a value obtained by dividing the planar orientation coefficient $\Delta P_a$ by the planar orientation coefficient $\Delta P_b$ that is measured before the heat treatment (treatment for 200 hours at 105° C.) for determining the planar orientation coefficient $\Delta P_a$ (more specifically, measured at room temperature (0 to 30° C.)). The ratio of the planar orientation coefficient $\Delta P_a$ with respect to the planar orientation coefficient $\Delta P_b$ (that is, $\Delta P_a/\Delta P_b$) is more preferably, for example, 1.085 or more and 1.5 or less, still more preferably 1.09 or more and 1.2 or less, particularly preferably 1.1 or more and 1.16 or less, and outstandingly preferably 1.105 or more and 1.14 or less, in view of further reducing the dielectric breakdown at a high temperature and at a high voltage. The ratio $\Delta P_a/\Delta P_b$ represents the temperature dependency of the planar orientation coefficient, and the aforementioned preferable ranges (for example, 1.085 or more, 1.085 or more and 1.5 or less, and the like) each mean that the temperature dependency is low. In other words, when the temperature dependency is low, leakage current caused by change in orientation of the resin molecule chains in the film and structural damage by Joule heating are further suppressed when the capacitor is used for a long period of time in an environment of high temperature and high voltage, which is preferable.

<1-3. Other Physical Properties of Film>

With respect to a lower limit, the thickness of the biaxially stretched polypropylene film of the present embodiment is preferably 1 μm or more, more preferably 1.5 μm or more, still more preferably 1.8 μm or more, and particularly preferably 2 μm or more. Further, with respect to an upper limit, the thickness of the biaxially stretched polypropylene film of the present embodiment is preferably 6 μm or less, more preferably 4 μm or less, still more preferably 3.5 μm or less, further more preferably less than 3 μm, and particularly preferably 2.9 μm or less. The thickness of the biaxially stretched polypropylene film for capacitors of the present embodiment is a value measured according to JIS-C2330 using a micrometer (JIS-B7502). When the thickness of the biaxially stretched polypropylene film is 6 μm or less, scale reduction and weight reduction of the capacitors obtained by using the biaxially stretched polypropylene film can be easily achieved.

The tensile strength of the polypropylene film of the present embodiment is preferably 500 MPa or more, more preferably 510 MPa or more, with respect to a lower limit of the sum of the tensile strength in the MD direction ($T_{MD}$) and the tensile strength in the TD direction ($T_{TD}$) (that is, $T_{MD}+T_{TD}$). Here, the tensile strength of the polypropylene film of the present embodiment is a value obtained by a measurement method described in the Examples. An upper limit of the sum ($T_{MD}+T_{TD}$) of the tensile strength of the polypropylene film of the present embodiment, although not limitative, is, for example, 700 MPa or less. When the sum of the tensile strength in the MD direction and the tensile strength in the TD direction at 23° C., which is a temperature at the time of measurement (described in JIS-C2151), is 500 MPa or more, the tensile strength at a high temperature also becomes comparatively large. Accordingly, generation of cracks and the like can be suppressed even when the capacitor is used for a long period of time at a high temperature. As a result, long-term voltage resistance at a high temperature can be suitably improved.

The ratio of the tensile strength in the TD direction to the tensile strength in the MD direction (that is, $T_{TD}/T_{MD}$) of the tensile strength of the polypropylene film of the present embodiment is preferably 1.80 or less, more preferably 1.70 or less, and still more preferably 1.65 or less. When $T_{TD}/T_{MD}$ is within each of the aforementioned ranges, poor molding at the time of producing the capacitor element is suppressed due to having a suitable tensile strength in the two orthogonal directions, so that hollow voids between the film layers can be easily maintained. As a result, the long-term voltage resistance at a high temperature can be suitably improved. With respect to a lower limit, $T_{TD}/T_{MD}$ is preferably 1.00 or more, more preferably 1.05 or more, and still more preferably 1.10 or more.

Here, as will be understood from the Examples, the polypropylene film of the present embodiment can be made favorable with respect to the poor stretching occupancy and thickness uniformity.

<1-4. Resin>

The polypropylene film of the present embodiment contains a polypropylene resin as the resin. Preferably, the major component of the polypropylene film of the present embodiment is a polypropylene resin. More preferably, the resin component constituting the film is a polypropylene resin. Here, the aforementioned "major component" means that the component is contained at 50 mass % or more, preferably 70 mass % or more, more preferably 90 mass % or more, still more preferably 95 mass % or more, and further more preferably 99 mass % or more, as converted in terms of solid components in the polypropylene film.

The polypropylene resin is not particularly limited, and those that can be used for forming the film can be widely used. Examples of the polypropylene resin include propylene homopolymers such as isotactic polypropylene and syndiotactic polypropylene; copolymer of propylene and ethylene; long-chain branched polypropylene; and ultrahigh molecular weight polypropylene. Preferably, propylene homopolymers can be mentioned as examples. More preferably, among these, isotactic polypropylene can be mentioned in view of heat resistance. Still more preferably, isotactic polypropylene obtained by homopolymerization of polypropylene in the presence of an olefin polymerization catalyst may be mentioned. The polypropylene resin may be used either alone as one kind or in combination of two or more kinds.

The weight average molecular weight (Mw) of the polypropylene resin is preferably 250,000 or more and 450,000 or less. When such a polypropylene resin is used, a moderate resin flowability is obtained at the time of biaxial stretching, and the thickness of the cast sheet can be easily controlled. It will be advantageously easy to obtain a biaxially stretched polypropylene film that has been made extremely thin and is suitable, for example, for small-scale and high-capacitance type capacitors. Also, unevenness of the thickness of the cast sheet and the biaxially stretched polypropylene film is advantageously unlikely to be generated. The weight average molecular weight (Mw) of the polypropylene resin is more preferably 270,000 or more, still more preferably 290,000 or more, in view of the thickness uniformity, mechanical properties, heat-mechanical properties and the like of the biaxially stretched polypropylene film. The weight average molecular weight (Mw) of the polypropylene resin is more preferably 400,000 or less in view of the flowability of the polypropylene resin and the stretchability in obtaining a biaxially stretched polypropylene film that has been made extremely thin.

The molecular weight distribution (Mw/Mn), which is calculated as a ratio of the weight average molecular weight (Mw) to the number average molecular weight (Mn) of the polypropylene resin, is preferably 7 or more and 12 or less. Also, the molecular weight distribution (Mw/Mn) is preferably 7.1 or more, more preferably 7.5 or more, and still more preferably 8 or more. Further, the molecular weight distribution (Mw/Mn) is preferably 11 or less, more preferably 10 or less. When such a polypropylene resin is used, a moderate resin flowability is obtained at the time of biaxial stretching, and it will be advantageously easy to obtain a biaxially stretched propylene film that has been made extremely thin without having a thickness unevenness. Also, such a polypropylene resin is preferable also in view of voltage resistance of the biaxially stretched polypropylene film. Further, by using such a polypropylene resin, the desired physical properties (crystallite size $S_a$ being 12.9 nm or less and the planar orientation coefficient $\Delta P_a$ being 0.013 or more) of the present embodiment can be obtained more easily.

The weight average molecular weight (Mw), number average molecular weight (Mn), Z-average molecular weight, and molecular weight distributions (Mw/Mn and Mz/Mn) of the polypropylene resin can be measured by a gel permeation chromatography (GPC) apparatus. More specifically, these can be measured by, for example, a HLC-8121GPC-HT high-temperature GPC apparatus with a built-in differential refractometer (RI) (trade name, produced by Tosoh Corporation). The GPC columns used are three coupled TSKgel GMHHR-H(20)HT columns (produced by Tosoh Corporation). The measured values of Mw and Mn were obtained by setting the column temperature to 140° C., and flowing trichlorobenzene as an eluate at a flow rate of 1.0 ml/10 min. A calibration curve of the molecular weight M of polystyrene standard (produced by Tosoh Corporation) is prepared, and the measured values are converted into polystyrene values to thereby obtain Mw, Mn, and Mz. Further, the base-10 logarithm of the molecular weight M of polystyrene standard is referred to as "logarithmic molecular weight (Log(M))".

The polypropylene resin preferably has a difference $(D_M)$, as obtained by subtracting a differential distribution value when the logarithmic molecular weight Log(M)=6.0 from a differential distribution value when Log(M)=4.5 on a molecular weight differential distribution curve, of −1% or more and 18% or less, more preferably 0% or more and 17% or less, still more preferably 2% or more and 17% or less, and particularly preferably 3% or more and 16% or less, based on 100% (standard) of the differential distribution value when Log(M)=6.0.

The "logarithmic molecular weight" is a logarithm of the molecular weight (M) (Log(M)), and the "difference $(D_M)$ as obtained by subtracting a differential distribution value when the logarithmic molecular weight is 6 from a differential distribution value when the logarithmic molecular weight is 4.5" is a value serving as an index of how much larger the amount of the component having a logarithmic molecular weight Log(M)=4.5, which is a typical distribution value of the component having a molecular weight of 10,000 to 100,000 on the low molecular weight side (hereafter also referred to as "low molecular weight component"), is than the amount of the component having Log(M)=around 6.0, which is a typical distribution value of the component having a molecular weight of around 1,000,000 on the high molecular weight side (hereafter also referred to as "high molecular weight component"). The state that the value of the difference $(D_M)$ is "positive" means that the amount of the low molecular weight component is larger than the amount of the high molecular weight component.

The differential distribution values can be obtained by GPC in the following manner. A time-intensity curve (generally called an "elution curve") obtained by a differential refractometer (RI) of GPC is used. Using a calibration curve obtained from polystyrene standard, the time axis is converted into the logarithm molecular weight (Log(M)) to thereby convert the elution curve into a curve showing the intensity with respect to Log(M). Since the RI detected intensity is proportional to the component concentration, an integral distribution curve with respect to the logarithmic molecular weight Log(M) can be obtained when the total area of the intensity curve is regarded as 100%. A differential distribution curve can be obtained by differentiating the integral distribution curve by Log(M). Thus, the "differential distribution" means the differential distribution of the concentration fraction with respect to the molecular weight. The relationship according to the present invention can be obtained by reading the differential distribution value at a specific Log(M) from this curve.

The melt flow rate (MFR) of the polypropylene resin at 230° C. and with a load of 2.16 kg is not particularly limited; however, the melt flow rate is preferably 7 g/10 min or less, more preferably 6 g/10 min or less, in view of the stretchability of the obtained film and the like. Further, the melt flow rate is preferably 0.3 g/10 min or more, more preferably 0.5 g/10 min or more, in view of enhancing the precision of the thickness of the polypropylene film of the present embodiment. Here, the aforementioned MFR can be measured in accordance with JIS K 7210-1999.

The mesopentad fraction ([mmmm]) of the polypropylene resin is preferably 94% or more, more preferably 95% or more, and still more preferably larger than 96%, with respect to a lower limit. Further, the mesopentad fraction of the polypropylene resin is preferably 98.5% or less, more preferably 98.4% or less, and still more preferably 98% or less, with respect to an upper limit. The upper limit and lower limit of the mesopentad fraction of the polypropylene resin are preferably 94% or more and 99% or less, more preferably 95% or more and 98.5% or less. When such a polypropylene resin is used, the crystallinity of the resin is moderately improved due to the moderately high stereoregularity, and the initial voltage resistance and the long-term voltage resistance are improved. Furthermore, desired stretchability can be obtained due to moderate solidification (crystallization) rate during molding of the cast sheet.

The mesopentad fraction [mmmm] refers to an index of stereoregularity that can be obtained by high-temperature nuclear magnetic resonance (NMR) spectroscopy. Specifically, the mesopentad fraction can be measured by, for example, a JNM-ECP500 high-temperature Fourier transform nuclear magnetic resonance system (high-temperature FT-NMR; produced by JEOL Ltd.). The observed nucleus is $^{13}$C (125 MHz), the measurement temperature is 135° C., and ortho-dichlorobenzene (ODCB: a mixed solvent of ODCB and deuterated ODCB (mixing ratio=4/1)) can be used as the solvent that dissolves the polypropylene resin. High-temperature NMR measurement can be carried out by, for example, the method described in "Polymer Analysis Handbook, New Edition, Japan Society for Analytical Chemistry, Research Committee of Polymer Analysis, Kinokuniya Company Ltd., 1995, p. 610".

The measurement mode is single-pulse proton broadband decoupling, the pulse width is 9.1 μsec (45° pulse), the pulse interval is 5.5 sec, the number of integrations is 4500, and the shift reference is CH$_3$(mmmm)=21.7 ppm.

Pentad fraction, which represents stereoregularity, is calculated as the percentage of the integrated value of the intensity of each signal derived from a combination of pentads (e.g., "mmmm" or "mrrm") arranged in the same direction (meso (m)) and arranged in different directions (racemo (r)). The assignment of each signal derived from "mmmm," "mrrm," or the like can be determined by referring to, for example, "T. Hayashi, et al., Polymer, Vol. 29, p. 138 (1988)."

The polypropylene resin preferably contains a polypropylene resin A. The weight average molecular weight of the polypropylene resin A is 250,000 or more and 450,000 or less, preferably 250,000 or more and 400,000 or less, and more preferably 250,000 or more and 340,000 or less.

Since the weight average molecular weight of the polypropylene resin A is 250,000 or more and 450,000 or less, resin flowability is moderate, the thickness of the cast sheet is easily controlled, and a thin stretched film can be easily produced. Further, the thickness of the sheet and film is less likely to be uneven, and the sheet can have a moderate stretchability, which is preferable.

The polypropylene resin A preferably has a molecular weight distribution (weight average molecular weight/number average molecular weight (Mw/Mn)) of 7 or more and 12 or less. Mw/Mn of the polypropylene resin A is preferably 7.1 or more, more preferably 7.5 or more, still more preferably 8 or more, further more preferably 8.5 or more, and particularly preferably 8.8 or more. Also, Mw/Mn of the polypropylene resin A is preferably 11.5 or less, more preferably 11 or less, still more preferably 10.5 or less, and particularly preferably 10 or less. Further, with respect to a combination of the upper limit and lower limit of Mw/Mn of the polypropylene resin A, the polypropylene resin A preferably has (Mw/Mn) of 7.1 or more and 12 or less, more preferably has (Mw/Mn) of 7.5 or more and 11 or less, still more preferably has (Mw/Mn) of 8 or more and 10.5 or less, and particularly preferably has (Mw/Mn) of 8.5 or more and 10 or less.

Further, the polypropylene resin A has a molecular weight distribution (Z-average molecular weight/number average molecular weight (Mz/Mn)) of 20 or more and 70 or less, preferably has a molecular weight distribution (Mz/Mn) of 25 or more and 60 or less, and more preferably has a molecular weight distribution (Mz/Mn) of 25 or more and 50 or less.

The polypropylene resin preferably contains the polypropylene resin A in an amount of 55 mass % or more, more preferably 60 mass % or more, based on 100 mass % of the entire polypropylene resin. Also, in a similar manner, the polypropylene resin preferably contains the polypropylene resin A in an amount of 90 mass % or less, more preferably 85 mass % or less, and still more preferably 80 mass % or less. Also, in a similar manner, with respect to a combination of the upper limit and lower limit of the content of the polypropylene resin A, the polypropylene resin preferably contains the polypropylene resin A in an amount of 55 mass % or more and 90 mass % or less, more preferably 60 mass % or more and 85 mass % or less, and particularly preferably 60 mass % or more and 80 mass % or less.

The aforementioned polypropylene resin A preferably has a difference ($D_M$), as obtained by subtracting a differential distribution value when the logarithmic molecular weight Log(M)=6.0 from a differential distribution value when Log(M)=4.5 on a molecular weight differential distribution curve, of 8% or more, more preferably 9% or more, and still more preferably 10% or more, based on 100% (standard) of the differential distribution value when Log(M)=6.0. Further, the difference $D_M$ of the polypropylene resin A is preferably 18% or less, more preferably 17% or less, and still more preferably 16% or less. Also, with respect to a combination of the upper limit and lower limit of the difference $D_M$ of the polypropylene resin A, the difference $D_M$ is preferably 8% or more and 18% or less, more preferably 10% or more and 17% or less, and still more preferably 12% or more and 16% or less.

When the amount of components in which the logarithmic molecular weight Log(M)=4.5, which is used as a typical distribution value of components having a molecular weight of 10,000 to 100,000 (hereinafter also referred to as "low-molecular-weight components"), which is lower than the Mw (250,000 to 450,000) of the polypropylene resin A, is compared with the amount of components in which Log (M)=around 6.0, which is a typical distribution value of components having a molecular weight of around 1,000,000 (hereinafter also referred to as "high-molecular-weight components"), which is higher than the Mw of the polypropylene resin A, it will be understood that the amount of the low-molecular-weight components is larger by a ratio of 8% or more and 18% or less.

That is, the molecular weight distribution Mw/Mn of 7 or more and 12 or less merely indicates the size of the molecular weight distribution; the quantitative relationship between the high-molecular-weight components and the low-molecular-weight components therein is unknown. Accordingly, it is preferable that the polypropylene resin A of the present embodiment has a broad molecular weight distribution, and contains components having a molecular weight of 10,000 to 100,000 in an amount larger by a ratio of 8% or more and 18% or less than the amount of components having a molecular weight of 1,000,000.

Since the polypropylene resin A has a difference ($D_M$), as obtained by subtracting a differential distribution value when the logarithm molecular weight Log(M)=6.0 from a differential distribution value when Log(M)=4.5, of 8% or more and 18% or less, based on 100% (standard) of the differential distribution value when Log(M) is 6.0, the polypropylene resin A contains low-molecular-weight components in an amount larger by a ratio of 8% or more and 18% or less than the amount of high-molecular-weight components. Therefore, the crystallite size is smaller, and it is easier to obtain a roughened surface with desired orientation, which is preferable.

The mesopentad fraction ([mmmm]) of the polypropylene resin A is 94% or more and less than 98%, preferably 94% or more and 97% or less, more preferably 94% or more and 96% or less, and particularly preferably 95% or more and 96% or less.

When the mesopentad fraction [mmmm] is 94% or more and less than 98%, the crystallinity of the resin is moderately improved due to the moderately high stereoregularity, and the initial voltage resistance and the long-term voltage resistance tend to be moderately improved. Furthermore, the solidification (crystallization) rate during molding of the cast sheet is moderate, resulting in moderate stretchability.

The polypropylene resin can contain a polypropylene resin B in addition to the polypropylene resin A.

With respect to the polypropylene resin B, it is preferable that Mw is 300,000 or more and 400,000 or less; Mw/Mn is 7 or more and 9 or less; and the difference ($D_M$), as obtained by subtracting a differential distribution value when the logarithm molecular weight Log(M)=6.0 from a differential distribution value when Log(M)=4.5 on a molecular weight distribution curve, is −1% or more and less than 8%, based on 100% (standard) of the differential distribution value when Log(M)=6.0.

Mw of the polypropylene resin B is 300,000 or more and 400,000 or less, more preferably 330,000 or more and 380,000 or less, and still more preferably larger than 340,000 and 380,000 or less.

Mw/Mn of the polypropylene resin B is preferably 7 or more, more preferably 7.1 or more, and still more preferably 7.5 or more. Further, Mw/Mn of the polypropylene resin B is preferably less than 8.8, more preferably 8.7 or less, still more preferably less than 8.5, and particularly preferably 8.4 or less. Also, with respect to a combination of the upper limit and lower limit of Mw/Mn of the polypropylene resin B, Mw/Mn of the polypropylene resin B is preferably 7 or more and 9 or less, more preferably 7.1 or more and 9 or less, still more preferably 7.1 or more and less than 8.5, further more preferably 7.1 or more and 8.4 or less, and particularly preferably 7.5 or more and 8.4 or less.

The polypropylene resin B preferably has a difference ($D_M$), as obtained by subtracting a differential distribution value when the logarithmic molecular weight Log(M)=6 from a differential distribution value when Log(M)=4.5 on a molecular weight differential distribution curve, of −1% or more, more preferably 0% or more, still more preferably 1% or more, and particularly preferably 3% or more, based on 100% (standard) of the differential distribution value when Log(M)=6. Further, the difference $D_M$ of the polypropylene resin B is preferably 9% or less, more preferably 8.5% or less, still more preferably less than 8%, and particularly preferably 7.5% or less. Also, with respect to a combination of the upper limit and lower limit of the difference $D_M$ of the polypropylene resin B, the difference $D_M$ is preferably 1% or more and 9% or less, more preferably 3% or more and 9% or less, and still more preferably 5% or more and 8.5% or less.

The polypropylene resin B preferably has a molecular weight distribution (Z-average molecular weight/number average molecular weight (Mz/Mn)) of 20 or more and 70 or less, more preferably has a molecular weight distribution (Mz/Mn) of 25 or more and 60 or less, and still more preferably has a molecular weight distribution (Mz/Mn) of 25 or more and 50 or less.

The mesopentad fraction ([mmmm]) of the polypropylene resin B is preferably 94% or more and 98% or less, more preferably 95% or more and 98% or less, still more preferably larger than 96% and less than 98%, and particularly preferably 96.5% or more and 97% or less.

The polypropylene resin preferably contains the polypropylene resin B in an amount of 10 mass % or more and 45 mass % or less, more preferably 15 mass % or more and 40 mass % or less, and particularly preferably 20 mass % or more and 40 mass % or less, based on 100 mass % of the polypropylene resin.

When the polypropylene resin contains the polypropylene resins A and B, the polypropylene resin preferably contains 55 mass % or more to 90 mass % or less of polypropylene resin A and 10 mass % or more to 45 mass % or less of polypropylene resin B, more preferably 60 mass % or more to 85 mass % or less of polypropylene resin A and 15 mass % or more to 40 mass % or less of polypropylene resin B, and particularly preferably 60 mass % or more to 80 mass % or less of polypropylene resin A and 20 mass % or more to 40 mass % or less of polypropylene resin B, based on the sum amount (100 mass %) of the polypropylene resins as a standard.

It is considered preferable that the polypropylene resin contains the polypropylene resins A and B for the following reason. Due to the differences between the polypropylene resins A and B regarding the weight average molecular weight, Mw/Mn, and differential distribution value difference ($D_M$), that is, the difference in the formation of molecular weight distribution, the polypropylene resins A and B have slightly different quantitative relationships between high-molecular-weight components and low-molecular-weight components, and thus a polypropylene film obtained from a mixture of resins A and B has a certain type of finely mixing (phase separation) state, and the crystal size can be easily reduced. Further, it is considered preferable that the polypropylene resin contains the polypropylene resins A and B because high orientation tends to be easily obtained even at the same stretch ratio, and it is easy to obtain a finely roughened surface. When the polypropylene resin contains both the polypropylene resins A and B, the present invention is considered to exhibit excellent effects for the reasons described above; however, these reasons do not limit the present invention.

The polypropylene resin according to the present embodiment can contain, and preferably contains, a long-chain branched polypropylene (a branched polypropylene; hereinafter also referred to as "polypropylene resin C") for the purpose of enhancing the surface smoothness and heat resistance.

In the present specification, the polypropylene resin C is not particularly limited, as long as it is a polypropylene generally called "a long-chain branched polypropylene" and has a long-chain branch, and the polypropylene film of the present embodiment can be obtained. Specific examples of the polypropylene resin C include Profax PF-814, PF-611, and PF-633 (all of which are produced by Basell); Daploy HMS-PP (e.g., WB130HMS, WB135HMS, and WB140HMS; all of which are produced by Borealis); and the like.

The polypropylene resin can contain and preferably contains the polypropylene resin C in an amount of 5 mass % or less, more preferably 0.5 mass % or more and 5 mass % or less, even more preferably 1 mass % or more and 4 mass % or less, and particularly preferably 1.5 mass % or more and 2.5 mass % or less. It is preferable that the polypropylene resin C is contained, because the surface of the obtained film is appropriately smoothed, and the melting point of the film can be increased by several degrees centigrade, thereby increasing the heat resistance.

When the polypropylene resin contains the polypropylene resins A to C, the polypropylene resin preferably contains 55 mass % or more to 90 mass % or less of polypropylene resin A, 10 mass % or more to 45 mass % or less of polypropylene resin B, and 5 mass % or less of polypropylene resin C; more preferably 55 mass % or more to 89.5 mass % or less of polypropylene resin A, 10 mass % or more to 44.5 mass % or less of polypropylene resin B, and 0.5 mass % or more to 5 mass % or less of polypropylene resin C; particularly preferably 60 mass % or more to 84 mass % or less of polypropylene resin A, 15 mass % or more to 39 mass % or less of polypropylene resin B, and 1 mass % or more to 4 mass % or less of polypropylene resin C; and further particularly preferably 60 mass % or more to 78.5 mass % or less of polypropylene resin A, 20 mass % or more to 38.5 mass % or less of polypropylene resin B, and 1.5 mass % or more to 2.5 mass % or less of polypropylene resin C, based on the sum amount (100 mass %) of the polypropylene resins as a standard.

The polypropylene resin according to the present embodiment can contain polypropylene resins (hereinafter also referred to as "other polypropylene resins") other than polypropylene resins described above. The "other polypropylene resins" are not particularly limited, as long as they are generally called polypropylene resins, and the polypropylene film targeted by the present invention can be obtained. The polypropylene resin according to the present embodiment can contain such other polypropylene resins in an amount that does not adversely affect the polypropylene film of the present invention.

The polypropylene film of the present embodiment preferably contains two types of polypropylene resins (polypropylene resin X and polypropylene resin Y) that are different in the molecular weight distribution (Mw/Mn) and/or in the difference ($D_M$). Further, the resins constituting the polypropylene film of the present embodiment are more preferably two types or three or more types that are different from each other in the molecular weight distribution and/or in the difference ($D_M$). In particular, the resins constituting the polypropylene film of the present embodiment are preferably two types that are different from each other in the molecular weight distribution and/or in the difference ($D_M$). The polypropylene resin X may be the polypropylene resin A described above, and the polypropylene resin Y may be the polypropylene resin B described above. By this, the desired physical properties (crystallite size $S_a$ being 12.9 nm or less and the planar orientation coefficient $\Delta P_a$ being 0.013 or more) of the present invention can be obtained more easily.

The molecular weight distribution (Mw/Mn) of the polypropylene resin X is, for example, 8 or more and 12 or less, preferably 8 or more and 11 or less, more preferably 8 or more and 10 or less, and still more preferably 8 or more and 9.5 or less.

The molecular weight distribution (Mw/Mn) of the polypropylene resin Y is, for example, 7 or more and 8 or less, preferably 7.5 or more and 8 or less.

The difference ($D_M$) of the polypropylene resin Y is, for example, 6% or more and less than 9%, preferably 7% or more and 8.5% or less.

The difference between the difference ($D_M$) of the polypropylene resin X and the difference ($D_M$) of the polypropylene resin Y is, for example, 2% or more and 6% or less, preferably 2.5% or more and 5% or less, and more preferably 3% or more and 4.5% or less. From this viewpoint, the difference ($D_M$) of the polypropylene resin X is, as one example, 2% or more and less than 6%, preferably 2.5% or more and 5% or less, and more preferably 3% or more and 4% or less. The difference ($D_M$) of the polypropylene resin X is, as another example, 9% or more and 15% or less, preferably 10% or more and 13% or less, and more preferably 10.5% or more and 12% or less.

When the polypropylene film of the present embodiment contains the polypropylene resin X and the polypropylene resin Y, the content of the polypropylene resin X is, for example, 50 mass % or more and 90 mass % or less, preferably 55 mass % or more and 80 mass % or less, and more preferably 60 mass % or more and 70 mass % or less, based on 100 mass % of a sum of the polypropylene resin X and the polypropylene resin Y; and the content of the polypropylene resin Y is, for example, 10 mass % or more and 50 mass % or less, preferably 20 mass % or more and 45 mass % or less, and more preferably 30 mass % or more and 40 mass % or less, based on 100 mass % of a sum of the polypropylene resin X and the polypropylene resin Y.

When the polypropylene film of the present embodiment contains the polypropylene resin X and the polypropylene resin Y, the content of a sum of the polypropylene resin X and the polypropylene resin Y is, for example, 70 mass % or more, preferably 80 mass % or more, more preferably 90 mass % or more, and still more preferably 95 mass % or more, based on 100 mass % of the polypropylene resin.

The polypropylene resin according to the present embodiment can further contain resins (hereinafter also referred to as "other resins") other than polypropylene resins. The "other resins" are not particularly limited, as long as they are generally called resins other than polypropylene resins, and the polypropylene film of the present invention can be obtained. Examples of other resins include polyolefins other than polypropylenes, such as polyethylene, poly(1-butene), polyisobutene, poly(1-pentene), and poly(1-methylpentene); copolymers of α-olefins, such as ethylene-propylene copolymers, propylene-butene copolymers, and ethylene-butene copolymers; vinyl monomer-diene monomer random copolymers, such as styrene-butadiene random copolymers; vinyl monomer-diene monomer-vinyl monomer random copolymers, such as styrene-butadiene-styrene block copolymers; and the like. The polypropylene resin according to the present embodiment can contain such other resins in an amount that does not adversely affect the polypropylene film of the present invention. In general, the polypropylene resin may contain other resins in an amount of preferably 10 parts by weight or less, and more preferably 5 parts by weight or less, based on 100 parts by weight of the polypropylene resin.

<1-5. Additive>

The polypropylene film of the present embodiment can further contain additives. The "additives" are not particularly limited, as long as they are generally used for polypropylene resins, and the polypropylene film of the present invention can be obtained. Examples of additives include necessary stabilizing agents, such as antioxidants, chlorine absorbers, and ultraviolet absorbers; lubricants, plasticizers, flame retardants, antistatic agents, colorants, etc. The polypropylene resin according to the present embodiment can contain such additives in an amount that does not adversely affect the polypropylene film of the present embodiment.

The "antioxidants" are not particularly limited, as long as they are generally called antioxidants and used for polypropylene, and the polypropylene film of the present invention can be obtained. Antioxidants are generally used for two purposes. One purpose is to suppress thermal degradation and oxidation degradation in the extruder, and the other purpose is to contribute to suppression of degradation due to long-term use as a capacitor film and improvement of capacitor performance. The antioxidant that suppresses the thermal degradation and oxidation degradation in the extruder is also referred to as the "primary agent," and the antioxidant that contributes to improvement of capacitor performance is also referred to as the "secondary agent."

Two types of antioxidants may be used for these two purposes, or one type of antioxidant may be used for the two purposes.

When two types of antioxidants are used, the polypropylene resin may contain a primary agent, such as 2,6-di-tertiary-butyl-para-cresol (generic name: BHT), in an amount of about 1000 ppm to 4000 ppm based on 100 parts by weight of the polypropylene resin. The antioxidant used for this purpose is mostly consumed in the molding step in the extruder, and hardly remains in the formed film (the remaining amount is generally less than 100 ppm).

A usable secondary agent is a hindered phenol-based antioxidant having a carbonyl group.

The "hindered phenol-based antioxidant having a carbonyl group" is not particularly limited, as long as it is generally called a hindered phenol-based antioxidant having a carbonyl group, and the polypropylene film of the present invention can be obtained.

Examples of the hindered phenol-based antioxidant having a carbonyl group include triethylene glycol-bis[3-(3-tertiary-butyl-5-methyl-4-hydroxyphenyl)propionate] (trade name: Irganox 245), 1,6-hexanediol-bis[3-(3,5-di-tertiary-butyl-4-hydroxyphenyl)propionate] (trade name: Irganox 259), pentaerythrityl tetrakis[3-(3,5-di-tertiary-butyl-4-hydroxyphenyl)propionate] (trade name: Irganox 1010), 2,2-thio-diethylenebis[3-(3,5-di-tertiary-butyl-4-hydroxyphenyl)propionate (trade name: Irganox 1035), octadecyl-3-(3,5-di-tertiary-butyl-4-hydroxyphenyl)propionate (trade name: Irganox 1076), N,N'-hexamethylenebis(3,5-di-tertiary-butyl-4-hydroxy-hydrocinnamide) (trade name: Irganox 1098), and the like. The most preferable among these is pentaerythrityl tetrakis[3-(3,5-di-tertiary-butyl-4-hydroxyphenyl)propionate], which has a high molecular weight, high compatibility with polypropylene, low volatility, and excellent heat resistance.

The polypropylene resin preferably contains a hindered phenol-based antioxidant having a carbonyl group in an amount of 5000 ppm by mass or more and 7000 ppm by mass or less, and more preferably 5500 ppm by mass or more and 7000 ppm by mass or less, based on 100 parts by weight of the polypropylene resin.

This is because a considerable amount of the hindered phenol-based antioxidant having a carbonyl group is also consumed in the extruder.

When the polypropylene resin does not contain a primary agent, a larger amount of hindered phenol-based antioxidant having a carbonyl group can be used. Since the consumption of the hindered phenol-based antioxidant having a carbonyl group in the extruder increases, it is preferable that the polypropylene resin contains the hindered phenol-based antioxidant having a carbonyl group in an amount of 6000 ppm by mass or more and 8000 ppm by mass or less, based on 100 parts by weight of the polypropylene resin.

The polypropylene film of the present embodiment contains one or more types of hindered phenol-based antioxidants having a carbonyl group (secondary agent) for the purpose of suppressing degradation that proceeds with time during a long period of use. The content of the one or more antioxidants in the film is preferably 4000 ppm by mass or more and 6000 ppm by mass or less, and more preferably 4500 ppm by mass or more and 6000 ppm by mass or less, based on 100 parts by weight of the polypropylene resin. In terms of development of appropriate effects, the content of the one or more antioxidants in the film is preferably 4000 ppm by mass or more and 6000 ppm by mass or less.

A capacitor film containing a specific optimal amount of hindered phenol-based antioxidant having a carbonyl group, which is molecularly compatible with polypropylene, is preferable, because while maintaining high voltage resistance performance resulting from the above-mentioned internal structure (crystallite size, planar orientation coefficient), the capacitance is not reduced (degradation does not proceed) for a long period of time (longer than 100 hours) even in an accelerated life test at a very high temperature of 110° C. or more, and the long-term durability is improved.

The polypropylene resin undergoes considerable thermal degradation (oxidative degradation) and shear degradation during the film-forming step (particularly in the extruder). The degree of progression of degradation, i.e., changes in the molecular weight distribution and stereoregularity, can be suppressed by nitrogen purge of the inside of the extruder (inhibition of oxidation), the shape of the screw in the extruder (shear force), the internal shape of the T-die during casting (shear force), the amount of the antioxidant added (inhibition of oxidation), the winding speed during casting (elongation force), etc.

The "chlorine absorber" is not particularly limited, as long as it is generally called a chlorine absorber and used for polypropylene, and the polypropylene film of the present invention can be obtained. Examples of the chlorine absorber include metal soaps, such as calcium stearate.

The "ultraviolet absorber" is not particularly limited, as long as it is generally used for polypropylene. Examples of the ultraviolet absorber include benzotriazole (Tinuvin328 produced by BASF Co., Ltd., etc.), benzophenone (Cysorb UV-531 produced by Cytec Co., Ltd., etc.), and hydroxybenzoate (UV-CHEK-AM-340 produced by Ferro Co., Ltd., etc.).

The "lubricant" is not particularly limited, as long as it is generally used for polypropylene. Examples of the lubricant include primary amides (stearamide, etc.), secondary amides (N-stearylstearamide, etc.), and ethylenebisamides (N,N'-ethylenebisstearamide, etc.).

The "plasticizer" is not particularly limited, as long as it is generally used for polypropylene. Examples of the plasticizer include polypropylene random copolymer, etc.

The "flame retardant" is not particularly limited, as long as it is generally used for polypropylene. Examples of the flame retardant include halogen compounds, aluminum hydroxide, magnesium hydroxide, phosphates, borates, antimony oxide, etc.

The "antistatic agent" is not particularly limited, as long as it is generally used for polypropylene. Examples of the antistatic agent include glycerin monoester (glycerin monostearate, etc.), ethoxylated secondary amines, etc.

The "colorant" is not particularly limited, as long as it is generally used for polypropylene. Examples of the colorant are within a range from cadmium and chromium-containing inorganic compounds to azo, quinacridone organic pigments.

<1-6. Production Method>
<1-6-1. Method of Producing Polypropylene Resin>

The polypropylene resin (containing the polypropylene resins A, B, and C) according to the present embodiment can generally be produced by a known polymerization method.

The method is not particularly limited, as long as the polypropylene resin according to the present invention can be produced. Examples of such polymerization methods include vapor phase polymerization, block polymerization, and slurry polymerization.

The polymerization may be single-stage (one-step) polymerization using a single polymerization reactor, or multistage polymerization using at least two or more polymerization reactors. Moreover, the polymerization may be carried out by adding hydrogen or a comonomer to the reactor as a molecular weight modifier.

The catalyst used is generally a known Ziegler-Natta catalyst, and is not particularly limited as long as the polypropylene resin of the present invention can be obtained. Moreover, the catalyst may contain a co-catalyst component and a donor. The molecular weight, molecular weight distribution, stereoregularity, etc., can be controlled by adjusting the catalyst and the polymerization conditions.

The "difference in the differential distribution values $(D_M)$" can be adjusted to a desired value by, for example, adjusting the polymerization conditions to adjust the molecular weight distribution, using a decomposition agent to selectively decompose high-molecular-weight components, or mixing resins having different molecular weights.

When the formation of molecular weight distribution is adjusted by the polymerization conditions, it is preferable to use a polymerization catalyst described later, because it is possible to easily adjust the formation of molecular weight distribution and molecular weight. In this case, it is preferable because it is possible to incorporate freely. An example of a method that uses a multistage polymerization reaction is described below.

The polymerization is carried out at a high temperature in the presence of a catalyst using a plurality of reactors, including a high-molecular-weight polymerization reactor, and a low-molecular-weight or intermediate-molecular-weight polymerization reactor. The amounts of high-molecular-weight components and low-molecular-weight components of the formed resin can be adjusted regardless of the order of the reactors. First, in a first polymerization step, propylene and a catalyst are supplied to a first polymerization reactor. Together with these components, hydrogen as a molecular weight modifier is mixed in an amount necessary to attain a required polymer molecular weight. In the case of slurry polymerization, for example, the reaction temperature is about 70 to 100° C., and the residence time is about 20 to 100 minutes. The plurality of reactors can be used in series, for example. In that case, the polymerization product of the first step is continuously sent to the next reactor together with additional propylene, catalyst, and molecular weight modifier. Subsequently, second polymerization is carried out to adjust the molecular weight lower or higher than that of the first polymerization step. The yield (production output) of the first and second reactors can be adjusted to control the composition (structure) of high-molecular-weight components and low-molecular-weight components.

The catalyst used is preferably a general Ziegler-Natta catalyst. The catalyst may contain a co-catalyst component and a donor. The molecular weight distribution can be controlled by suitably adjusting the catalyst and the polymerization conditions.

When the formation of molecular weight distribution of the polypropylene raw resin is adjusted by peroxide decomposition, peroxide treatment using a decomposing agent, such as hydrogen peroxide or organic oxide, is preferred.

It is known that when a peroxide is added to a disintegration-type polymer, such as polypropylene, a reaction of extracting hydrogen from the polymer occurs, and that some of the resulting polymer radicals are recombined and undergo a crosslinking reaction, while most of the radicals undergo secondary decomposition (β cleavage) to be divided into two polymers having a lower molecular weight. Accordingly, decomposition of high-molecular-weight components proceeds with a high probability, thereby increasing the amount of low-molecular weight components. Thus, the formation of molecular weight distribution can be adjusted. An example of the method that can obtain a resin containing a suitable amount of low-molecular-weight components by peroxide decomposition is described below.

About 0.001 mass % to 0.5 mass % of organic peroxide, such as 1,3-bis(tertiary-butylperoxideisopropyl)-benzene, is added to a polymer powder or pellets of a polypropylene resin obtained by polymerization while taking into consideration the target composition (structure) of high-molecular-weight components and low-molecular-weight components, followed by melting and kneading in a melt-kneader at about 180° C. to 300° C.

When the content of low-molecular-weight components is adjusted by blending (resin mixing), it is preferable that at least two or more resins having different molecular weights are dry-mixed or melt-mixed.

In general, a mixed system of two types of polypropylenes obtained by mixing a primary resin with about 1 to 40 mass % of an additional resin having an average molecular weight higher or lower than that of the primary resin is preferably used, because it facilitates the adjustment of the amount of low-molecular-weight components.

In addition, in the case of the adjustment by mixing, the melt flow rate (MFR) can be used as an indicator of the average molecular weight. In this case, the MFR difference between the primary resin and the additional resin is preferably about 1 to 30 g/10 min, in terms of convenience during adjustment.

The method for mixing the plural polypropylene raw material resins (primary polypropylene resin A, additional polypropylene resin B, etc.) of the present invention is not particularly limited. Examples of the method include a method comprising dry-blending a polymer powder or pellets using a mixer etc.; and a method comprising supplying a polymer powder or pellets of the primary polypropylene resin A, additional polypropylene resin B, etc., to a kneader, followed by melting and kneading to thereby obtain a blended resin. Either of these methods can be used.

The mixer and kneader are not particularly limited. The kneader can be any of a single-screw type kneader, a two-screw type kneader, or a multi-screw type kneader having three or more screws. When a kneader having two or more screws is used, the type of kneading may be rotation in the same direction or different directions.

In the case of blending by melting and kneading, the kneading temperature is not particularly limited, as long as favorable kneading is obtained; however, the temperature is generally within a range of 200° C. to 300° C., and preferably 230° C. to 270° C. An overly high kneading temperature is not preferable, because this leads to the degradation of the resin. In order to prevent resin degradation during kneading and mixing, the kneader may be purged with an inert gas, such as nitrogen. The molten kneaded resin can be pelletized into a suitable size using a commonly known pelletizer to thereby obtain mixed polypropylene raw material resin pellets.

The total ash content derived from polymerization catalyst residues etc. contained in the polypropylene raw material resin of this embodiment is preferably as low as possible, in order to improve electrical characteristics. The total ash content is preferably 50 ppm or less, more preferably 40 ppm or less, and particularly preferably 30 ppm or less, based on 100 parts by weight of the polypropylene resin. improved.

<1-6-2. Method of Producing Cast Sheet>

The "unstretched cast sheet" for producing the biaxially stretched polypropylene film of the present embodiment can be molded by a known method. For example, polypropylene resin pellets, dry-mixed polypropylene resin pellets (and/or a polymer powder), or mixed polypropylene resin pellets prepared by melt-kneading beforehand are supplied to an extruder, heated and melted, passed through a filtration filter, heated and melted at 170° C. to 320° C., preferably 200° C. to 300° C., molten-extruded from a T-die, and cooled and solidified by at least one metal drum maintained at 80° C. to 140° C., thereby forming an unstretched cast sheet.

When the temperature of the group of metal drums is maintained at 80° C. to 140° C., preferably 90° C. to 120° C., and more preferably 90° C. to 105° C. during molding of the unstretched cast sheet, the β-crystal fraction of the obtained cast sheet determined by an X-ray method is about 1% or more and 50% or less, preferably about 5% or more and 30% or less, and more preferably about 5% or more and 20% or less. It should be noted that this value is a value when no β-crystal nucleating agent is contained.

The above range of β-crystal fraction is preferable because physical properties, i.e., capacitor properties and element-winding processability, can both be satisfied.

The β-crystal fraction is obtained by X-ray diffraction intensity measurement. This value can be calculated by the method described in "A. Turner-Jones, et al., Makromol. Chem., Vol. 75, p. 134 (1964)," and is referred to as the K value. More specifically, the proportion of β crystals is expressed by the ratio of the sum of three diffraction peak heights derived from α crystals, and a single diffraction peak height derived from β crystals.

The thickness of the cast sheet is not particularly limited, as long as the polypropylene film of the present embodiment can be obtained. In general, the thickness is preferably 0.05 mm to 2 mm, and more preferably 0.1 mm to 1 mm.

<1-6-3. Method of Producing Polypropylene Film>

The polypropylene film of the present embodiment can be produced by stretching the polypropylene cast sheet. Stretching is carried out by biaxial stretching that causes orientation along longitudinal and lateral axes. The stretching method is, for example, a simultaneous or sequential biaxial stretching method, preferably a sequential biaxial stretching method.

In the sequential biaxial stretching method, the cast sheet is, for example, first maintained at a temperature of 100° C. to 160° C. (longitudinal stretching temperature), and stretched by a factor of 3 to 7 (longitudinal stretching ratio) in the machine direction by passing the sheet between rolls having different speeds, and the sheet is immediately cooled to room temperature. Subsequently, the stretched film is guided to a tenter and stretched by a factor of 3 to 11 (lateral stretching ratio) in the width direction at a temperature of 150° C. or more (lateral stretching temperature) and at a stretching angle of 5° to 17° (lateral stretching angle). Then, the film is relaxed, solidified by heat, and wound. The wound film is subjected to aging treatment at a temperature of about 20° C. to 45° C., and cut to a desired product width.

Here, the lateral stretching angle refers to an angle formed by a straight line $L_x$, which connects between one end edge $P_x$ in the width direction of the stretched film at the time point of starting the lateral stretching step and one end edge $P_y$ (on the same side as $P_x$) in the width direction of the stretched film at the time point of ending the lateral stretching step, and a straight line $L_y$ which starts at $P_x$ and is parallel to the extrusion direction.

In the above production steps, the longitudinal stretching temperature, longitudinal stretching ratio, lateral stretching angle, lateral stretching temperature, lateral stretching ratio, selection of one type or two or more types of polypropylene resin and physical properties thereof (particularly, the molecular weight distribution), the resin temperature during melting, MFR of the cast film, relaxation ratio in the width direction after the lateral stretching, relaxation temperature, and the like are parameters that affect the desired properties (crystallite size $S_a$ being 12.9 nm or less and the planar orientation coefficient $\Delta P_a$ being 0.013 or more) of the present invention. By suitably adjusting these parameters, the polypropylene of the present embodiment can be more easily obtained. Among these parameters, the longitudinal stretching temperature and lateral stretching angle are parameters that particularly affect the desired properties of the present invention. With respect to a part of these, one example of an adjustment range thereof will be shown below:

<Longitudinal Stretching Temperature>

In order that the desired properties of the present invention are easily provided, the longitudinal stretching temperature is preferably 120 to 150° C., more preferably 125 to 142° C., and still more preferably 128 to 140° C. With respect to a lower limit of the longitudinal stretching temperature, 120° C. or more, 125° C. or more, and 128° C. or more are respectively preferable. With respect to an upper limit of the longitudinal stretching temperature, 150° C. or less, 148° C. or less, 145° C. or less, 142° C., and 140° C. are respectively preferable.

<Longitudinal Stretching Ratio>

In order that the desired properties of the present invention are easily provided, the longitudinal stretching ratio is preferably 3 to 5.

<Lateral Stretching Angle>

In order that the desired properties of the present invention are easily provided, a lower limit of the lateral stretching angle is preferably 8.5° or more, more preferably 9° or more, still more preferably 10° or more, and particularly preferably 10.5° or more. Also, in order that the desired properties of the present invention are easily provided, an upper limit of the lateral stretching angle is preferably 15° or less, more preferably 14° or less, still more preferably 13° or less, and particularly preferably 12° or less.

<Lateral Stretching Temperature>

In order that the desired properties of the present invention are easily provided, a lower limit of the lateral stretching temperature is preferably 150° C. or more, more preferably 153° C. or more, and still more preferably 155° C. or more. Also, in order that the desired properties of the present invention are easily provided, an upper limit of the lateral stretching temperature is preferably 180° C. or less, more preferably 165° C. or less, still more preferably 160° C. or less, further more preferably 159° C. or less, and particularly more preferably 158° C. or less. Further, in order that the desired properties of the present invention are easily provided, the lateral stretching temperature is preferably 150 to 180° C., more preferably 155 to 165° C., with respect to the upper and lower limit.

<Lateral Stretching Ratio>

In order that the desired properties of the present invention are easily provided, the lateral stretching ratio is preferably 5 to 11, more preferably 7 to 11, and still more preferably 9 to 11.

According to such a stretching step, the film has excellent mechanical strength and rigidity, and surface irregularities are more clarified. Thus, a finely surface-roughened stretched film is obtained. The surface of the polypropylene film of the present embodiment is preferably imparted with suitable surface roughness that results in favorable capacitor properties while improving the winding suitability.

The surface of the polypropylene film of the present embodiment is preferably finely roughened in such a manner that at least one side of the film has a surface roughness such that the center line average roughness (Ra) is 0.03 µm or more and 0.08 µm or less, and the maximum height (Rz; Rmax as formerly defined in JIS) is 0.3 µm or more and 0.8 µm or less. When Ra and Rz are within the above preferable range, the surface can be a finely roughened surface. In capacitor processing, winding wrinkles are less likely to be formed in element-winding processing, and the film can be preferably wound. Further, since uniform contact can be formed between the films, the voltage resistance and the long-term voltage resistance can also be improved.

In the present specification, "Ra" and "Rz" (Rmax as formerly defined in JIS) refer to values measured by a commonly and widely used stylus-type surface roughness tester (e.g., a stylus-type surface roughness tester using a diamond stylus or the like) according to the method defined, for example, in JIS-B0601: 2001. More specifically, "Ra" and "Rz" can be determined by, for example, using a Surfcom 1400D-3DF-12 three-dimensional surface roughness meter (produced by Tokyo Seimitsu Co., Ltd.) according to the method defined in JIS-B 0601: 2001.

Various known surface-roughening methods, such as embossing and etching, can be used to impart fine irregularities to the film surface. Preferred among these is a surface-roughening method using β crystals, which does not require mixing of impurities. The proportion of β crystals can be generally controlled by changing the cast temperature and cast speed. Moreover, the melting/transformation ratio of β crystals can be controlled by the roll temperature in the longitudinal stretching step. The finely roughened surface properties can be obtained by selecting the optimum production conditions for these two parameters, i.e., β-crystal formation and melting/transformation thereof.

The polypropylene film of the present embodiment has a high initial voltage resistance and has an excellent long-term voltage resistance. Further, since the surface is finely roughened, the film is excellent in element winding suitability. Furthermore, since the film can be made extremely thin, a high capacitance can be easily exhibited. Accordingly, the film can be used extremely suitably in small-scale and high-capacitance capacitors of 5 µF or more, preferably 10 µF or more, and more preferably 20 µF or more.

In the polypropylene film of the present embodiment, corona discharge treatment may be carried out online or offline after completion of the stretching and thermal solidification step, for the purpose of enhancing adhesive properties in a subsequent step, such as a metal deposition processing step. Corona discharge treatment can be performed by a known method. The treatment is preferably performed in an atmospheric gas, such as air, carbon dioxide gas, nitrogen gas, or a mixed gas thereof.

<2. Metallized Film for Capacitors>

Next, a metallized film for capacitors according to one embodiment of the present invention will be described.

The metallized film for capacitors according to the present embodiment is a metallized film for capacitors having a metal film on one surface or on both surfaces of the polypropylene film according to the present embodiment. Hereafter, this will be described in detail.

The polypropylene film of the present embodiment can be provided with an electrode on one surface or on both surfaces, in order to process the film as a capacitor. Such an electrode is not particularly limited, as long as the capacitor targeted by the present invention can be obtained. Any electrode generally used to produce a capacitor can be used. Examples of the electrode include metal foil, paper having at least one metallized surface, plastic films, and the like.

Since capacitors are required to have a smaller size and a lighter weight, it is preferable that one side or both sides of the film of the present invention is directly metallized to form an electrode or electrodes. Examples of usable metals include single metals, such as zinc, lead, silver, chromium, aluminum, copper, and nickel; mixtures of several kinds of these metals; alloys thereof; and the like. In consideration of the environment, economical efficiency, capacitor performance, etc., zinc and aluminum are preferable.

Examples of the method for directly metallizing the surface of the polypropylene film of the present embodiment include vacuum deposition and sputtering. The method is not particularly limited, as long as the capacitor targeted by the present invention can be obtained. Vacuum deposition is preferable, in terms of productivity, economical efficiency, etc. General examples of vacuum deposition include a crucible method, a wire method, and the like; however, the method is not particularly limited, as long as the capacitor targeted by the present invention can be obtained. An optimal method can be suitably selected.

The film resistance of the metal vapor deposition film is preferably about 1 to 100Ω/□ in view of the electrical properties of the capacitor. A rather high film resistance within this range is desirable in view of the self-healing (self-correction) properties, and the film resistance is more preferably 5Ω/□ or more, still more preferably 10Ω/□ or more. Also, the film resistance is more preferably 50Ω/□ or less, still more preferably 30Ω/□ or less, in view of the safety as a capacitor. The film resistance of the metal vapor deposition film can be measured, for example, during the metal vapor deposition by a four-terminal method known to those skilled in the art. The film resistance of the metal vapor deposition film can be adjusted, for example, by adjusting the output of the vaporization source to adjust the vaporization amount.

In forming a metal vapor deposition film on one surface of the film, an insulation margin is formed by not vapor-depositing on a certain width from one end of the film so that a capacitor may be formed when the film is wound. Further, it is preferable to form a heavy edge structure at an end that is opposite to the insulation margin so as to make firm the bonding between the metallized polypropylene film and a metallicon electrode, and the film resistance of the heavy edge is typically about 1 to 8Ω/□, preferably about 1 to 5Ω/□. The thickness of the metal film is not particularly limited and is preferably, for example, 1 to 200 nm.

The margin pattern of the formed metal vapor deposition film is not particularly limited. However, in view of improving the capacitor properties such as storage stability, it is preferable to form a pattern containing a so-called special margin such as a fishnet pattern, a T-margin pattern, or the like. When a metal vapor deposition film is formed with a pattern containing a special margin on one surface of the polypropylene film of the present embodiment, storage stability of the obtained capacitor is improved, and this is effective also in terms of preventing breakage, short-circuiting, and the like of the capacitor, so that it is preferable.

The method for forming a margin can be a commonly known method, such as a tape method of performing masking with a tape at the time of vapor deposition, an oil method of performing masking by application of an oil, or the like, which can be used without any restrictions.

The metallized film of the present embodiment can be processed into a capacitor of the present embodiment described later by passing through a winding process of winding the film along a longitudinal direction of the film. In other words, a pair of two sheets of the metallized film of the present embodiment are superposed onto each other and wound so that the metal vapor deposition film and the polypropylene film are alternately stacked. Thereafter, a pair of metallicon electrodes are formed by metal thermal spraying on two end surfaces, so as to produce a film capacitor, whereby a capacitor is obtained.

<3. Capacitor>

Next, a capacitor according to one embodiment of the present invention will be described.

The capacitor according to the present embodiment is a capacitor including the metallized film of the present embodiment. Hereafter, this will be described in detail.

In the step of producing a capacitor, a process of winding the film is carried out. For example, a pair of two sheets of the metallized film of the present embodiment are superposed onto each other and wound so that the metal film of the present embodiment and the polypropylene film of the present embodiment are alternately stacked and further that an insulation margin part is on the opposite side. During this process, it is preferable that a pair of two sheets of the metallized film of the present embodiment are stacked by shifting the film for 1 to 2 mm. The winding machine used is not particularly limited and, for example, an automatic winding machine 3KAW-N2 type produced by Kaido Manufacturing Co., Ltd. or the like can be used.

In the case of producing a flat-type capacitor, pressing is typically performed on the obtained wound article after winding. Pressing promotes winding fastening of the capacitor and shaping of the element. In view of controlling and stabilizing the interlayer gap, the imparted pressure is 2 to 20 kg/cm$^2$, though the optimal value thereof changes depending on the thickness and the like of the polypropylene film of the present embodiment.

Subsequently, a metal is thermally sprayed onto two end surfaces of the wound article to provide a metallicon electrode, whereby a capacitor is produced.

A predetermined heat treatment is further carried out on the capacitor. That is, in the present embodiment, the process includes a step of performing a heat treatment on the capacitor in vacuum at a temperature of 80 to 125° C. for one hour or more (hereafter, this step may be referred to as "thermal aging").

In the aforementioned step of performing a heat treatment on the capacitor, the temperature of heat treatment is typically 80° C. or more, preferably 90° C. or more. On the other hand, the temperature of heat treatment is typically 130° C. or less, preferably 125° C. or less. The effect of thermal aging can be obtained by performing the heat treatment at the temperature described above. Specifically, the hollow voids between the films constituting the capacitor based on the metallized film of the present embodiment decrease, and corona discharge is suppressed. Moreover, the internal structure of the metallized film of the present embodiment changes to promote crystallization. As a result, it is considered that the voltage resistance is improved. When the temperature of heat treatment is lower than a predetermined temperature, the aforementioned effect produced by thermal aging cannot be sufficiently obtained. On the other hand, when the temperature of heat treatment is higher than a predetermined temperature, thermal decomposition, oxidation degradation, and the like may be generated in the polypropylene film.

The method of performing heat treatment on the capacitor may be suitably selected from among known methods including, for example, a method of using a thermostatic tank in a vacuum atmosphere, a method of using high-frequency induction heating, and the like. Specifically, the method of using a thermostatic tank is preferably adopted.

The period of time for performing heat treatment is preferably one hour or more in view of obtaining mechanical and thermal stability, and is more preferably 10 hours or more. However, in view of preventing poor molding such as heat wrinkles and tracing, the period of time for performing heat treatment is more preferably 20 hours or less.

A leading wire is typically welded on the metallicon electrode of the capacitor subjected to thermal aging. Also, in order to impart weather resistance and particularly to prevent humidity degradation, it is preferable to enclose the capacitor into a case and perform potting with an epoxy resin.

The capacitor of the present embodiment is a small-scale and high-capacitance type capacitor based on the metallized film of the present embodiment and has a high voltage resistance at a high temperature and a long-term durability at a high temperature.

EXAMPLES

Next, the present invention will be described further more specifically by way of Examples; however, these examples are provided for explaining the present invention and do not limit the present invention. The terms "parts" and "%" in the examples indicate "parts by mass" and "% by mass," respectively, unless specifically indicated otherwise.

(1) Method of Measuring and Method of Calculating Physical Property Values

The weight average molecular weight (Mw), molecular weight distribution (Mw/Mn), difference ($D_M$) (the difference ($D_M$) is an abbreviated expression for the difference obtained by subtracting a differential distribution value when a logarithmic molecular weight Log(M)=6.0 from a differential distribution value when Log(M)=4.5 on a molecular weight differential distribution curve), mesopentad fraction ([mmmm]), thickness, rate of capacitance change ΔC, crystallite size, retardation value, birefringence value, and planar orientation coefficient ΔP, which are respective physical property values, were measured and calculated by the following methods.

<Measurement of Weight Average Molecular Weight (Mw), Molecular Weight Distribution (Mw/Mn), Molecular Weight Distribution (Mz/Mn), and Differential Distribution Value of Polypropylene Resin>

Measurement and calculation were made under the following conditions using GPC (gel permeation chromatography).

Measurement device: HLC-8121GPC/HT high-temperature GPC apparatus with a built-in differential refractometer (RI) produced by Tosoh Corporation Column: three coupled TSKgel GMHhr-H(20)HT columns produced by Tosoh Corporation Column temperature: 145° C.

Eluate: trichlorobenzene

Flow rate: 1.0 ml/min

A calibration curve was prepared using polystyrene standard produced by Tosoh Corporation, the measured molecular weight values were converted into polypropylene values, and Z-average molecular weight (Mz), weight average molecular weight (Mw), and number average molecular weight (Mn) were obtained. Mz and Mn were used to obtain a molecular weight distribution (Mz/Mn), and Mw and Mn were used to obtain a molecular weight distribution (Mw/Mn).

Differential distribution values were obtained in the following manner. First, a time curve (elution curve) of intensity distribution detected by an RI detector was converted into a distribution curve with respect to the molecular weight M (Log(M)) of the above polystyrene standard using the calibration curve produced using the polystyrene standard. Next, after an integral distribution curve with respect to Log(M) when the total area of the distribution curve was regarded as 100% was obtained, the integral distribution curve was differentiated by Log(M) to thereby obtain a differential distribution curve with respect to Log(M). Differential distribution values when Log(M)=4.5 and when Log(M)=6.0 were read from this differential distribution curve. The series of operations until the differential distribution curve was obtained was carried out using analysis software provided in the GPC measurement apparatus.

<Mesopentad Fraction>

The polypropylene resin was dissolved in a solvent, and measurement was made under the following conditions using a high-temperature Fourier transform nuclear magnetic resonance apparatus (high-temperature FT-NMR). High-temperature nuclear magnetic resonance (NMR) apparatus: high-temperature Fourier transform nuclear magnetic resonance apparatus (high-temperature FT-NMR), JNM-ECP500, produced by JEOL Ltd.

Observed nucleus: $^{13}$C (125 MHz)

Measurement temperature: 135° C.

Solvent: Ortho-dichlorobenzene (ODCB; a mixed solvent of ODCB and deuterated ODCB (4/1))

Measurement mode: Single-pulse proton broadband decoupling

Pulse width: 9.1 μsec (45° pulse)

Pulse interval: 5.5 sec

Number of integrations: 4500

Shift reference: $CH_3$(mmmm)=21.7 ppm

The mesopentad fraction representing the stereoregularity degree was calculated as a percentage (%) from the integrated value of the intensity of each signal derived from a combination of 5 pentads (pentads) of pentads "meso (m)" arranged in the same direction and pentads "racemo (r)" arranged in different directions (mmmm, mrrm, and the like). Regarding the assignment of each signal derived from mmmm, mrrm, or the like, a reference was made to, for example, the description of spectra in "T. Hayashi, et al., Polymer, Vol. 29, p. 138 (1988)" and the like.

<Film Thickness>

Measurement was made using a micrometer (JIS-B7502) according to JIS-C2330.

<Tensile Strength>

The tensile strength of the polypropylene film was measured according to JIS-C2151. Here, the measurement directions were set to be MD (machine direction) and TD (transverse direction).

<Rate of Capacitance Change ΔC>

With respect to the capacitance of the capacitor, the initial capacitance (also referred to as $C_0$) before the test was evaluated using LCR HiTESTER3522-50 produced by Hioki E.E. Corporation. Next, the capacitor was continuously loaded with a voltage of direct-current 700 V for 1000 hours in a high-temperature tank of 105° C. The capacitance of the element after 1000 hours had passed (also referred to as $C_{1000}$) was measured with an LCR tester, and rate of capacitance change before and after the loading with voltage was calculated. Here, the relevant rate of capacitance change is $(C_{1000}-C_0)/C_0$. The rate of capacitance change after 1000 hours had passed was evaluated by an average value of two capacitors. The rate of capacitance change after 1000 hours have passed is preferably −5% to 0% (−5% or more and 0% or less).

<Poor Stretching Occupancy>

The length in the width direction of the part where poor stretching (stretching unevenness, non-stretching, and the like) had been generated in the wound film (before the heat treatment) was measured, and the ratio of the length in the width direction of the part where poor stretching had been generated relative to the width length was calculated as the poor stretching occupancy. When the obtained poor stretching occupancy is less than 2% (<2%), the film is in an extremely favorable condition. When the obtained poor stretching occupancy is 2% or more and less than 7%, the film is in a favorable condition.

<Thickness Uniformity>

A sum of 100 sheets of test pieces having a square shape with 10 cm in the longitudinal direction and 10 cm in the width direction were cut out from the wound film (before the heat treatment). The test pieces were cut out in the number of 10 multiplied by 10 with 10 columns in the longitudinal direction and 10 columns in the width direction of the film. The interval of each column in the longitudinal direction was maintained to be constant, and the interval of each column in the width direction was maintained to be constant. Subsequently, 10 sheets of the test pieces were superposed for each column in the width direction, so as to obtain 10 parts of test piece bundles. Next, with respect to the obtained 10 parts of the test piece bundles, the thickness of each test piece bundle (in an amount of the film thickness of 10 sheets) was measured using a micrometer (JIS-B7502) according to JIS-C2330. An average value of the obtained data was determined as X, and the difference between the minimum value and the maximum value was determined as R. The value calculated by (R/X)×100(%) was determined as an index of the film thickness uniformity. When the obtained index is less than 2.5% (<2.5%), the film is in an extremely favorable condition. When the obtained index is 2.5% or more and less than 3.0%, the film is in a favorable condition.

<Crystallite Size>

The crystallite size of the biaxially stretched polypropylene film was measured and evaluated using an XRD (wide angle X-ray diffraction) apparatus in the following manner.

Measurement instrument: MiniFlex300 (produced by Rigaku Corporation) desktop X-ray diffractometer
X-ray generation output: 30 kV, 10 mA
Irradiated X-rays: monochromatized CuKα rays (wavelength: 0.15418 nm)
Detector: scintillation counter
Goniometer scanning: 2θ/θ continuous scanning The half width of the diffraction reflection peak of an α-crystal (040) plane was calculated from the obtained data using an analytical computer and using PDXL, integrated X-ray powder analysis software originally bundled with the apparatus. The crystallite size was determined from the obtained half width of the diffraction reflection peak of the α-crystal (040) plane using Scherrer's equation ($D=K\times\lambda/(\beta\times\cos\theta)$). Here, in Scherrer's equation, D is the crystallite size (nm), K is the constant (shape factor: 0.94 is adopted in the present Examples), λ is the wavelength (nm) of the X-rays used, β is the determined half width, and θ is the diffraction Bragg angle.

<Retardation Value>

The retardation (phase difference) value of the biaxially stretched polypropylene film was measured by a gradient method, as described below.
Measurement instrument: RE-100 retardation measuring device (produced by Otsuka Electronics Co., Ltd.)
Light source: LED light source with a wavelength of 550 nm
Measurement method: The angular dependence of the retardation value was measured by the following gradient method. The main axes in the in-plane direction of the film were regarded as the x-axis and the y-axis, and the thickness direction (normal direction relative to the in-plane direction) of the film was regarded as the z-axis. Of the in-plane direction axes, the slow axis having a higher refractive index was regarded as the x-axis, and each retardation value when the x-axis, which served as an inclined axis, was inclined 10° by 10° within the range of 0° to 50° relative to the z-axis was determined. For example, in a sequential stretching method, when the stretch ratio in the TD direction (transverse direction) is higher than the stretch ratio in the MD direction (machine direction), the TD direction serves as the slow axis (x-axis), and the MD direction serves as the y-axis.

<Birefringence Value and Planar Orientation Coefficient ΔP>

From the retardation value, the planar orientation coefficient ΔP was calculated in the following manner according to the non-patent document "Hiroshi AWAYA, Guide for polarization microscope of high-molecular-weight material, pp. 105-120, 2001".

First, with respect to each inclination angle ϕ, the value of R/d obtained by dividing the measured retardation value R by the thickness d subjected to inclination correction was determined. A difference between R/d when ϕ=0° and each of R/d when ϕ=10°, 20°, 30°, 40°, 50° was determined, and the difference was further divided by sin 2r (r: refraction angle) to obtain the birefringence ΔNzy for each ϕ, followed by reversing the positive and negative signs to obtain the value of birefringence ΔNyz. The value of birefringence ΔNyz was calculated as an average of ΔNyz when ϕ=20°, 30°, 40°, 50°.

Next, the value obtained by dividing the retardation value R measured at an inclination angle of ϕ=0° by the thickness d was divided by ΔNzy determined in the above to calculate the value of birefringence ΔNxz.

Finally, ΔP was determined by substituting the values of birefringence ΔNyz and ΔNxz into the equation: $\Delta P=(\Delta Nyz+\Delta Nxz)/2$. Here, for the values of refraction angle r at respective inclination angles ϕ with respect to polypropylene, those described on page 109 of the aforementioned Non-Patent Document were used.

(2) Production of Biaxially Stretched Polypropylene Film, Measurement and Calculation of Physical Property Values

Example 1

Example 1-1. Production of Cast Sheet

PP resin A1 [Mw=320,000, Mw/Mn=9.3, difference ($D_M$)=11.2 (the "difference ($D_M$)" is an abbreviated expression for the difference obtained by subtracting a differential distribution value when a logarithmic molecular weight Log(M)=6.0 from a differential distribution value when Log(M)=4.5 on a molecular weight differential distribution curve), mesopentad fraction [mmmm]=95%, produced by Prime Polymer Co., Ltd.] and PP resin B1 [Mw=350,000, Mw/Mn=7.7, difference ($D_M$)=7.2, mesopentad fraction [mmmm]=96.5%, produced by Korean Petrochemical Industry Corporation] were supplied at a ratio of 65:35 to an extruder and melted at a resin temperature of 250° C. Thereafter, the resultant was extruded with use of a T-die, wound around a metal drum having a surface temperature maintained at 95° C., and solidified to produce a cast sheet.

Example 1-2. Production of Biaxially Stretched Polypropylene Film

The obtained non-stretched cast sheet was maintained at a temperature of 130° C. and stretched by a factor of 4 in the machine direction by passing the sheet between rolls having different speeds, and the sheet was immediately cooled to room temperature. Subsequently, the stretched film was guided to a tenter and stretched by a factor of 10 in the width direction at a temperature of 160° C. and at a stretching angle of 11°. Then, the film was relaxed, solidified by heat, and wound. The wound film was subjected to aging treatment at a temperature of about 30° C. to obtain a biaxially stretched polypropylene film having a thickness of 2.5 μm.

Example 1-3. Measurement of Physical Property Values Before Heat Treatment

With respect to the obtained polypropylene film, the crystallite size $S_b$ of α-crystal (040) and the planar orientation coefficient $\Delta P_b$ were measured in an environment having a room temperature of 20° C.

Example 1-4. Measurement of Physical Property Values after Heat Treatment

The obtained polypropylene film was put into a high-temperature tank of 105° C. from the environment having a room temperature of 20° C. and left to stand quietly for 200 hours from the time point of putting. Next, after the film was left to stand quietly for one hour at a room temperature of 20° C., the crystallite size $S_a$ of α-crystal (040) and the planar orientation coefficient $\Delta P_a$ were measured by a similar method.

Example 1-5. Production of Capacitor and Long-Term Voltage Resistance, Rate of Capacitance Change ΔC Next, a capacitor was produced in the following manner by using the obtained biaxially stretched polypropylene film. A T-margin vapor deposition pattern was applied by performing aluminum vapor deposition at a vapor deposition resistance of 15Ω/☐ on the biaxially stretched polypropylene film, so as to obtain a metallized film including a metal film on one surface of the film. After the film was slit to 60 mm width, two sheets of metallized films were superposed and wound for 1076 turns at a winding tension of 250 g with use of an automatic winding machine 3KAW-N2 type produced by Kaido Manufacturing Co., Ltd. The element subjected to element winding was subjected to heat treatment for 15 hours at 120° C. while being pressed, followed by thermal spraying of zinc metal on the element end surface to obtain a flat-type capacitor. A leading wire was bonded with solder to the end surface of the flat-type capacitor, and thereafter the capacitor was sealed with an epoxy resin. The capacitance of the produced capacitor was 75 μF (±5 μF).

After direct current was applied to the obtained capacitor for 1000 hours at a voltage of 700 V at a test environment temperature of 105° C., the capacitance was measured, and the rate of capacitance change ΔC was determined.

Example 1-6. Calculation of Poor Stretching Occupancy

The poor stretching occupancy was calculated with respect to the obtained biaxially stretched polypropylene film (biaxially stretched polypropylene film after winding, obtained in Example 1-2).

Example 1-7. Calculation of Thickness Uniformity Index

The thickness uniformity index [(R/X)×100(%)] was calculated with respect to the obtained biaxially stretched polypropylene film (biaxially stretched polypropylene film after winding, obtained in Example 1-2).

Example 2

A biaxially stretched polypropylene film (thickness of 2.5 μm) and a capacitor were produced and evaluated in the same manner as in Example 1 except that the non-stretched cast sheet was stretched in the machine direction while maintaining a temperature of 140° C. in producing the biaxially stretched polypropylene film.

Example 3

A biaxially stretched polypropylene film (thickness of 2.5 μm) and a capacitor were produced and evaluated in the same manner as in Example 1 except that the non-stretched cast sheet was stretched in the machine direction while maintaining a temperature of 145° C. in producing the biaxially stretched polypropylene film.

Example 4

A biaxially stretched polypropylene film (thickness of 2.5 μm) and a capacitor were produced and evaluated in the same manner as in Example 1 except that the cast sheet was guided to a tenter and stretched at a stretching angle of 9° in producing the biaxially stretched polypropylene film.

Example 5

A biaxially stretched polypropylene film (thickness of 2.5 μm) and a capacitor were produced and evaluated in the same manner as in Example 1 except that a PP resin A2 [Mw=330,000, Mw/Mn=8.3, difference $(D_M)$=3.6 (difference obtained by subtracting a differential distribution value when the logarithmic molecular weight is 6 from a differential distribution value when the logarithmic molecular weight is 4.5 on a molecular weight distribution curve), mesopentad fraction [mmmm]=95%, produced by Prime Polymer Co., Ltd.] was used instead of the PP resin A1 in producing the cast sheet.

Example 6

A biaxially stretched polypropylene film and a capacitor were produced and evaluated in the same manner as in Example 1 except that a PP resin B2 [Mw=380,000, Mw/Mn=8.3, difference (DM)=0.6, mesopentad fraction [mmmm]=96.7%, produced by Korean Petrochemical Industry Corporation] was used instead of the PP resin B1 in producing the cast sheet.

Example 7

A biaxially stretched polypropylene film and a capacitor were produced and evaluated in the same manner as in Example 1 except that the cast sheet was stretched by a factor of 10 in the width direction at a temperature of 158° C. in producing the biaxially stretched polypropylene film.

Example 8

A biaxially stretched polypropylene film and a capacitor were produced and evaluated in the same manner as in Example 1 except that the non-stretched cast sheet was stretched in the machine direction while maintaining a temperature of 140° C. and stretched by a factor of 10 in the width direction at a temperature of 158° C. in producing the biaxially stretched polypropylene film.

Example 9

A biaxially stretched polypropylene film and a capacitor were produced and evaluated in the same manner as in Example 1 except that the non-stretched cast sheet was stretched in the machine direction while maintaining a temperature of 145° C. and stretched by a factor of 10 in the width direction at a temperature of 158° C. in producing the biaxially stretched polypropylene film.

Example 10

A biaxially stretched polypropylene film and a capacitor were produced and evaluated in the same manner as in Example 1 except that the cast sheet was stretched by a factor of 10 in the width direction at a temperature of 162° C. in producing the biaxially stretched polypropylene film.

Comparative Example 1

A biaxially stretched polypropylene film (thickness of 2.5 μm) and a capacitor were produced and evaluated in the same manner as in Example 1 except that the non-stretched cast sheet was stretched in the machine direction while maintaining a temperature of 125° C. in producing the biaxially stretched polypropylene film.

Comparative Example 2

A biaxially stretched polypropylene film (thickness of 2.5 μm) and a capacitor were produced and evaluated in the same manner as in Example 1 except that the non-stretched cast sheet was stretched in the machine direction while maintaining a temperature of 120° C. in producing the biaxially stretched polypropylene film.

Comparative Example 3

A biaxially stretched polypropylene film (thickness of 2.5 μm) and a capacitor were produced and evaluated in the same manner as in Example 1 except that the cast sheet was guided to a tenter and stretched at a stretching angle of 12° in producing the biaxially stretched polypropylene film.

Comparative Example 4

A biaxially stretched polypropylene film (thickness of 2.5 μm) and a capacitor were produced and evaluated in the same manner as in Example 1 except that the cast sheet was guided to a tenter and stretched at a stretching angle of 14° in producing the biaxially stretched polypropylene film.

Comparative Example 5

A biaxially stretched polypropylene film (thickness of 2.5 μm) and a capacitor were produced and evaluated in the same manner as in Example 5 except that the non-stretched cast sheet was stretched in the machine direction while maintaining a temperature of 125° C. in producing the biaxially stretched polypropylene film.

(3) <Evaluation of Physical Property Values>

The production conditions of Examples 1 to 10 and Comparative Examples 1 to 5 are shown in Table 1, and the respective physical property values are shown in Table 2. Here, in Table 2, the symbol of "<1" represents less than 1, and the symbol of "<−10" represents less than −10.

TABLE 1

| | Polypropylene resin | | | | Longitudinal stretching temperature [° C.] | Lateral stretching temperature [° C.] | Lateral stretching angle [deg] |
|---|---|---|---|---|---|---|---|
| | Resin A1 [mass %] | Resin A2 [mass %] | Resin B1 [mass %] | Resin B2 [mass %] | | | |
| Example 1 | 65 | — | 35 | — | 130 | 160 | 11 |
| Example 2 | 65 | — | 35 | — | 140 | 160 | 11 |
| Example 3 | 65 | — | 35 | — | 145 | 160 | 11 |
| Example 4 | 65 | — | 35 | — | 130 | 160 | 9 |
| Example 5 | — | 65 | 35 | — | 130 | 160 | 11 |
| Example 6 | 65 | — | — | 35 | 130 | 160 | 11 |
| Example 7 | 65 | — | 35 | — | 130 | 158 | 11 |
| Example 8 | 65 | — | 35 | — | 140 | 158 | 11 |
| Example 9 | 65 | — | 35 | — | 145 | 158 | 11 |
| Example 10 | 65 | — | 35 | — | 130 | 162 | 11 |
| Comparative Example 1 | 65 | — | 35 | — | 125 | 160 | 11 |
| Comparative Example 2 | 65 | — | 35 | — | 120 | 160 | 11 |
| Comparative Example 3 | 65 | — | 35 | — | 130 | 160 | 12 |
| Comparative Example 4 | 65 | — | 35 | — | 130 | 160 | 14 |
| Comparative Example 5 | — | 65 | 35 | — | 125 | 160 | 11 |

TABLE 2

| | Tensile strength | | | | Before heat treatment | | After heat treatment | | Ratio before and after heat treatment | | | | |
|---|---|---|---|---|---|---|---|---|---|---|---|---|---|
| | MD direction [MPa] | TD direction [MPa] | Sum of MD direction and TD direction [MPa] | TD/MD ratio [—] | Crystallite size Sb [nm] | Planar orientation coefficient ΔPb [—] | Crystallite size Sa [nm] | Planar orientation coefficient ΔPa [—] | Ratio of crystallite size Sa/Sb [—] | Ratio of planar orientation coefficient ΔPa/ΔPb [—] | ΔC [%] | Poor stretching occupancy [%] | Thickness uniformity [%] |
| Example 1 | 186 | 328 | 514 | 1.763 | 11.8 | 0.0117 | 12.9 | 0.0133 | 1.0932 | 1.1368 | −0.1 | <1 | 2.6 |
| Example 2 | 186 | 331 | 517 | 1.780 | 11.8 | 0.0127 | 12.7 | 0.0140 | 1.0763 | 1.1024 | −1.7 | <1 | 2.3 |
| Example 3 | 193 | 339 | 532 | 1.756 | 11.9 | 0.0127 | 12.9 | 0.0139 | 1.0840 | 1.0945 | −1.8 | <1 | 2.2 |
| Example 4 | 206 | 317 | 523 | 1.539 | 11.6 | 0.0118 | 12.8 | 0.0136 | 1.1034 | 1.1525 | −0.2 | <1 | 2.8 |
| Example 5 | 210 | 327 | 537 | 1.557 | 11.5 | 0.0122 | 12.5 | 0.0135 | 1.0870 | 1.1066 | −0.9 | 4.4 | 2.4 |
| Example 6 | 199 | 327 | 526 | 1.643 | 11.7 | 0.0132 | 12.3 | 0.0149 | 1.0513 | 1.1288 | −0.1 | 3.5 | 2.6 |
| Example 7 | 196 | 316 | 512 | 1.612 | 11.7 | 0.0121 | 12.7 | 0.0131 | 1.0855 | 1.0826 | −0.9 | 2.1 | 2.8 |
| Example 8 | 200 | 324 | 524 | 1.620 | 11.8 | 0.0122 | 12.7 | 0.0139 | 1.0763 | 1.1393 | −1.9 | 1.8 | 2.6 |
| Example 9 | 186 | 320 | 506 | 1.720 | 11.8 | 0.0123 | 12.6 | 0.0134 | 1.0678 | 1.0894 | −1.7 | 1.1 | 2.3 |
| Example 10 | 181 | 309 | 490 | 1.707 | 12.0 | 0.0120 | 12.8 | 0.0131 | 1.0667 | 1.0917 | −3.7 | <1 | 2.9 |
| Comparative | 178 | 308 | 486 | 1.730 | 11.8 | 0.0123 | 13.0 | 0.0133 | 1.1017 | 1.0813 | −8.2 | 7.9 | 2.7 |

TABLE 2-continued

| | Tensile strength | | | | Before heat treatment | | After heat treatment | | Ratio before and after heat treatment | | | | |
|---|---|---|---|---|---|---|---|---|---|---|---|---|---|
| | MD direction [MPa] | TD direction [MPa] | Sum of MD direction and TD direction [MPa] | TD/MD ratio [—] | Crystallite size Sb [nm] | Planar orientation coefficient ΔPb [—] | Crystallite size Sa [nm] | Planar orientation coefficient ΔPa [—] | Ratio of crystallite size Sa/Sb [—] | Ratio of planar orientation coefficient ΔPa/ΔPb [—] | ΔC [%] | Poor stretching occupancy [%] | Thickness uniformity [%] |
| Example 1 Comparative Example 2 | 185 | 318 | 503 | 1.719 | 11.9 | 0.0117 | 13.0 | 0.0124 | 1.0924 | 1.0598 | −8.0 | 9.1 | 3.3 |
| Comparative Example 3 | 197 | 320 | 517 | 1.624 | 11.8 | 0.0122 | 13.3 | 0.0137 | 1.1271 | 1.1230 | <−10 | <1 | 3.9 |
| Comparative Example 4 | 197 | 275 | 472 | 1.396 | 12.1 | 0.0119 | 13.1 | 0.0125 | 1.0826 | 1.0504 | −9.2 | <1 | 4.3 |
| Comparative Example 5 | 213 | 321 | 534 | 1.507 | 11.5 | 0.0122 | 12.5 | 0.0128 | 1.0870 | 1.0492 | <−10 | <1 | 2.7 |

As shown in Table 2, with respect to capacitors fabricated by using a biaxially stretched polypropylene film having a crystallite size $S_a$ of 12.9 nm or less and a planar orientation coefficient $\Delta P_a$ of 0.013 or more after heat treatment (treatment for 200 hours at 105° C.) (Examples 1 to 10), decrease in capacitance was extremely small even after the capacitors were treated for a long period of time at a high temperature and at a high voltage (−2%<rate of capacitance change ΔC<0).

Further, as shown in Table 2, the biaxially stretched polypropylene films before heat treatment according to Examples 1 to 10 were favorable also in terms of poor stretching occupancy and thickness uniformity.

On the other hand, with respect to capacitors fabricated by using a biaxially stretched polypropylene film in which one or both of the crystallite size $S_a$ and the planar orientation coefficient $\Delta P_a$ after the above heat treatment did not satisfy the abovementioned standards (Comparative Examples 1 to 5), decrease in capacitance was conspicuous after the capacitors were treated for a long period of time at a high temperature and at a high voltage (rate of capacitance change ΔC≤−8.0%). From the above, it has been found out that the state in which the crystallite size $S_a$ and the planar orientation coefficient $\Delta P_a$ after the above heat treatment are above or equal to (or below or equal to) the standard values is a parameter for suppressing decrease in capacitance after the capacitor is treated for a long period of time at a high temperature and at a high voltage.

The invention claimed is:

1. A biaxially stretched polypropylene film comprising a polypropylene resin and satisfying the following (a) and (b):
   (a) a crystallite size $S_a$, which is determined using a Scherrer's equation from a half width of an α-crystal (040) plane reflection peak as measured by wide-angle X-ray diffraction after treatment for 200 hours at 105° C., is 12.9 nm or less; and
   (b) a planar orientation coefficient $\Delta P_a$, which is calculated from birefringence values ΔNyz and ΔNxz with respect to a thickness direction as determined by optical birefringence measurement after treatment for 200 hours at 105° C., is 0.013 or more, wherein $\Delta P_a =$ (ΔNyz+ΔNxz)/2.

2. The biaxially stretched polypropylene film according to claim 1, which is for capacitors.

3. The biaxially stretched polypropylene film according to claim 1, further satisfying the following (c):
   (c) a ratio of the crystallite size $S_a$ of said (a) with respect to a crystallite size $S_b$ that is determined using a Scherrer's equation from a half width of an α-crystal (040) plane reflection peak as measured by wide-angle X-ray diffraction before treatment for 200 hours at 105° C., wherein the ratio is $S_a/S_b$ is 1 or more and 1.125 or less.

4. The biaxially stretched polypropylene film according to claim 1, further satisfying the following (d):
   (d) a ratio of the planar orientation coefficient $\Delta P_a$ of said (b) with respect to a planar orientation coefficient ΔPb that is calculated from birefringence values ΔNyz and ΔNxz with respect to a thickness direction as determined by optical birefringence measurement before treatment for 200 hours at 105° C., wherein the ratio $\Delta P_a/\Delta P_b$ is 1.085 or more, wherein ΔPb=(ΔNyz+ΔNxz)/2.

5. The biaxially stretched polypropylene film according to claim 1, wherein the crystallite size $S_a$ of said (a) is 11.5 nm or more.

6. The biaxially stretched polypropylene film according to claim 1, wherein:
   said polypropylene resin comprises at least two or more kinds of a polypropylene resin A and a polypropylene resin B;
   a molecular weight distribution (Mw/Mn) of said polypropylene resin A is within a range of 8.8 or more to 12 or less; and
   a molecular weight distribution (Mw/Mn) of said polypropylene resin B is within a range of less than 8.8.

7. The biaxially stretched polypropylene film according to claim 1, wherein:
   said polypropylene resin comprises at least two or more kinds of a polypropylene resin A and a polypropylene resin B;
   the polypropylene resin A has a difference ($D_M$), as obtained by subtracting a differential distribution value when a logarithmic molecular weight Log(M)=6.0 from a differential distribution value when Log(M)=4.5 on a molecular weight differential distribution curve, of 8% or more and 18% or less based on 100% (standard) of the differential distribution value when Log(M)=6.0; and the polypropylene resin B has a difference ($D_M$), as obtained by subtracting a differential distribution value when a logarithmic molecular weight Log(M)=6.0 from a differential distribution value when Log(M)=4.5 on a molecular weight differential distribution curve, of −1% or more and less than 8% based on 100% (standard) of the differential distribution value when Log (M)=6.0.

8. The biaxially stretched polypropylene film according to claim 1, having a thickness of 1 to 6 μm.

9. A metallized film for capacitors, having a metal film on one surface or on both surfaces of a biaxially stretched polypropylene film according to claim 1.

10. A capacitor comprising a metallized film for capacitors according to claim 9.

11. The biaxially stretched polypropylene film according to claim 1, wherein the biaxially stretched polypropylene film is produced by stretching at a lateral stretching angle of 5° or more and 11° or less.

* * * * *